United States Patent
Yerramalli et al.

(10) Patent No.: US 10,034,283 B2
(45) Date of Patent: Jul. 24, 2018

(54) CSI AND ACK REPORTING ENHANCEMENTS IN LTE/LTE-A WITH UNLICENSED SPECTRUM

(71) Applicant: QUALCOMM Incorporated, San Diego, CA (US)

(72) Inventors: Srinivas Yerramalli, San Diego, CA (US); Tao Luo, San Diego, CA (US); Wanshi Chen, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 14/464,409

(22) Filed: Aug. 20, 2014

(65) Prior Publication Data

US 2015/0055588 A1 Feb. 26, 2015

Related U.S. Application Data

(60) Provisional application No. 61/869,532, filed on Aug. 23, 2013.

(51) Int. Cl.
*H04W 72/04* (2009.01)
*H04L 1/00* (2006.01)
*H04L 5/00* (2006.01)

(52) U.S. Cl.
CPC ........ *H04W 72/0446* (2013.01); *H04L 5/005* (2013.01); *H04L 1/00* (2013.01); *H04L 5/0007* (2013.01); *H04L 5/0073* (2013.01)

(58) Field of Classification Search
CPC .. H04W 72/0446; H04L 5/005; H04L 5/0073; H04L 1/00; H04L 5/0007
See application file for complete search history.

(56) References Cited

U.S. PATENT DOCUMENTS

2006/0133381 A1 6/2006 Wang et al.
2010/0232384 A1* 9/2010 Farajidana ............. H04L 5/005
370/329

(Continued)

OTHER PUBLICATIONS

Dahlman E., et al., "4G LTE/LTE-Advanced for Mobile Broadband—chapter 10," In: "4G LTE/LTE-Advanced for Mobile Broadband—Chapter 10," Mar. 29, 2011 (Mar. 29, 2011), XP055046016, pp. 145-202, p. 158-p. 161.

(Continued)

*Primary Examiner* — Phuc Tran
(74) *Attorney, Agent, or Firm* — Norton Rose Fulbright, LLP

(57) ABSTRACT

Channel state information (CSI) and acknowledgement (ACK) reporting enhancements in Long Term Evolution (LTE)/LTE-Advanced (LTE-A) enabling communications over an unlicensed spectrum are disclosed. For example, ACK/NAK may include unlicensed spectrum interference information, such as WIFI interference. Additionally, in anticipation of a future downlink transmission, UEs may report WiFi interference to base stations absent a current downlink transmission. Also, CSI-RS and/or IMR resources may be staggered across subframes and/or within slots of subframes. Further, CSI reporting may include separate reports for CSI-RS resources that experience unlicensed spectrum interference and interference free CSI-RS resources. Still further, CSI reports may include a request to the base station to switch the current channel or band. Finally, inter-RAT ACK and CSI reporting may be provided on a second unlicensed spectrum band, such as a WIFI band, for a first unlicensed spectrum band, such as an LTE/LTE-A unlicensed band.

19 Claims, 17 Drawing Sheets

(56) References Cited

U.S. PATENT DOCUMENTS

| | | | | | |
|---|---|---|---|---|---|
| 2012/0287875 | A1* | 11/2012 | Kim | ...................... | H04L 5/0048 370/329 |
| 2013/0039203 | A1* | 2/2013 | Fong | ...................... | H04B 7/024 370/252 |
| 2014/0247749 | A1* | 9/2014 | Kim | ...................... | H04B 7/024 370/252 |
| 2014/0301232 | A1* | 10/2014 | Rao | ...................... | H04W 24/02 370/252 |
| 2015/0063177 | A1* | 3/2015 | Kim | ......................... | H04L 5/00 370/280 |

OTHER PUBLICATIONS

International Search Report and Written Opinion—PCT/US2014/052056—ISA/EPO—dated Oct. 30, 2014.
Samsung: "DM-RS for Extended CP," 3GPP Draft; R1-103380 DM-RS for extended CP, 3rd Generation Partnership Project (3GPP), Mobile Competence Centre; 650, Route Des Lucioles; F-06921 Sophia-Antipolis Cedex, France vol. RAN WG1, No. Montreal, Canada; May 10, 2010, May 15, 2010 (May 15, 2010), XP050420453, [retrieved on May 15, 2010] figures 2-3, 6, p. 1-p. 2.

* cited by examiner

CSI AND ACK REPORTING ENHANCEMENTS IN LTE/LTE-A WITH UNLICENSED SPECTRUM

CROSS-REFERENCE TO RELATED APPLICATIONS

This application claims the benefit of U.S. Provisional Patent Application No. 61/869,532, entitled, "CSI AND ACK REPORTING ENHANCEMENTS IN LTE-U", filed on Aug. 23, 2013, which is expressly incorporated by reference herein in its entirety.

BACKGROUND

Field

Aspects of the present disclosure relate generally to wireless communication systems, and more particularly, to channel state information (CSI) and acknowledgement (ACK) reporting enhancements in long term evolution (LTE)/LTE-Advanced (LTE-A) with unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In an aspect, method of wireless communication, includes receiving, by a user equipment (UE), a transmission from a base station. The method additionally includes determining, by the UE, whether unlicensed spectrum interference is present during the transmission received from the base station. The method also includes attempting, by the UE, to decode the transmission. The method further includes generating, by the UE, a response containing information regarding results of the attempt to decode the transmission and information regarding the unlicensed spectrum interference. The method still further includes sending, by the UE, the response to the base station.

In an aspect, a wireless communication apparatus includes means for receiving, by a user equipment (UE), a transmission from a base station. The apparatus additionally includes means for determining, by the UE, whether unlicensed spectrum interference is present during the transmission received from the base station. The apparatus also includes means for attempting, by the UE, to decode the transmission. The apparatus further includes means for generating, by the UE, a response containing information regarding results of the attempt to decode the transmission and information regarding the unlicensed spectrum interference. The apparatus still further includes means for sending, by the UE, the response to the base station.

In an aspect, a non-transitory computer-readable medium having program code recorded thereon. The program code includes code for causing one or more computers to receive, by a user equipment (UE), a transmission from a base station. The program code additionally includes code for causing the one or more computers to determine, by the UE, whether unlicensed spectrum interference is present during the transmission received from the base station. The program code also includes code for causing the one or more computers to attempt, by the UE, to decode the transmission. The program code further includes code for causing the one or more computers to generate, by the UE, a response containing information regarding results of the attempt to decode the transmission and information regarding the unlicensed spectrum interference. The program code still further includes code for causing the one or more computers to send, by the UE, the response to the base station.

In an aspect, a user equipment (UE) includes at least one processor and a memory coupled to the at least one processor. The at least one processor is configured to receive, by the UE, a transmission from a base station. The at least one processor is additionally configured to determine, by the UE, whether unlicensed spectrum interference is present during the transmission received from the base station. The at least one processor is also configured to attempt, by the UE, to decode the transmission. The at least one processor is further configured to generate, by the UE, a response containing information regarding results of the attempt to decode the transmission and information regarding the unlicensed spectrum interference. The at least one processor is still further configured to send, by the UE, the response to the base station.

In an aspect, a method of wireless communication includes receiving, by a base station, responses from a user equipment (UE) over time, wherein the responses include at least one of acknowledgements (ACKs) or a non-acknowledgements (NAKs) of transmissions sent to the UE by the base station, and wherein the responses includes information regarding unlicensed spectrum interference experienced by the UE during the transmissions. The method additionally includes accumulating over time, by the base station, the information regarding unlicensed spectrum interference experienced by the UE. The method also includes determining, by the base station, based on the information accumulated over time, a severity of the unlicensed spectrum interference experienced by the UE over time. The method further includes taking corrective action, by the base station, based on the severity of the unlicensed spectrum interference experienced by the UE over time.

In an aspect, a wireless communication apparatus includes means for receiving, by a base station, responses from a user equipment (UE) over time, wherein the responses include at least one of acknowledgements (ACKs) or a non-acknowledgements (NAKs) of transmissions sent to the UE by the base station, and wherein the responses includes information regarding unlicensed spectrum interference experienced by the UE during the transmissions. The apparatus additionally includes means for accumulating over time, by the base station, the information regarding unlicensed spectrum interference experienced by the UE. The apparatus also includes means for determining, by the base station, based on the information accumulated over time, a severity of the unlicensed spectrum interference experienced by the UE over time. The apparatus further includes means for taking corrective action, by the base station, based on the severity of the unlicensed spectrum interference experienced by the UE over time.

In an aspect, a non-transitory computer-readable medium having program code recorded thereon. The program code includes code for causing one or more computers to receive, by a base station, responses from a user equipment (UE) over time, wherein the responses include at least one of acknowledgements (ACKs) or a non-acknowledgements (NAKs) of transmissions sent to the UE by the base station, and wherein the responses includes information regarding unlicensed spectrum interference experienced by the UE during the transmissions. The program code additionally includes code for causing the one or more computers to accumulate over time, by the base station, the information regarding unlicensed spectrum interference experienced by the UE. The program code also includes code for causing the one or more computers to determine, by the base station, based on the information accumulated over time, a severity of the unlicensed spectrum interference experienced by the UE over time. The program code further includes code for causing the one or more computers to take corrective action, by the base station, based on the severity of the unlicensed spectrum interference experienced by the UE over time.

In an aspect, a base station includes at least one processor and a memory coupled to the at least one processor. The at least one processor is configured to receive, by the base station, responses from a user equipment (UE) over time, wherein the responses include at least one of acknowledgements (ACKs) or a non-acknowledgements (NAKs) of transmissions sent to the UE by the base station, and wherein the responses includes information regarding unlicensed spectrum interference experienced by the UE during the transmissions. The at least one processor is additionally configured to accumulate over time, by the base station, the information regarding unlicensed spectrum interference experienced by the UE. The at least one processor is also configured to determine, by the base station, based on the information accumulated over time, a severity of the unlicensed spectrum interference experienced by the UE over time. The at least one processor is further configured to take corrective action, by the base station, based on the severity of the unlicensed spectrum interference experienced by the UE over time.

In an aspect, a method of wireless communication includes receiving, by a user equipment (UE), a channel state condition report request from a base station. the method additionally includes determining, by the UE, whether unlicensed spectrum interference is present. The method also includes generating, by the UE, a report containing information regarding the unlicensed spectrum interference experienced by the UE. The method further includes sending, by the UE, the report to the base station.

In an aspect, a wireless communication apparatus includes means for receiving, by a user equipment (UE), a channel state condition report request from a base station. The apparatus additionally includes means for determining, by the UE, whether unlicensed spectrum interference is present. The apparatus also includes means for generating, by the UE, a report containing information regarding the unlicensed spectrum interference experienced by the UE. The apparatus further includes means for sending, by the UE, the report to the base station.

In an aspect, a non-transitory computer-readable medium having program code recorded thereon. The program code includes code for causing one or more computers to receive, by a user equipment (UE), a channel state condition report request from a base station. The program code additionally includes code for causing the one or more computers to determine, by the UE, whether unlicensed spectrum interference is present. The program code also includes code for causing the one or more computers to generate, by the UE, a report containing information regarding the unlicensed spectrum interference experienced by the UE. The program code further includes code for causing the one or more computers to send, by the UE, the report to the base station.

In an aspect, a user equipment (UE) includes at least one processor and a memory coupled to the at least one processor. The at least one processor is configured to receive, by the UE, a channel state condition report request from a base station. The at least one processor is additionally configured to determine, by the UE, whether unlicensed spectrum interference is present. The at least one processor is also configured to generate, by the UE, a report containing information regarding the unlicensed spectrum interference experienced by the UE. The at least one processor is further configured to send, by the UE, the report to the base station.

In an aspect, a method of wireless communication includes transmitting, by a base station, a channel state condition report request to a user equipment (UE). The method additionally includes receiving, by the base station, a channel state condition report from a UE, wherein the channel state condition report includes information regarding unlicensed spectrum interference experienced by the UE. The method also includes determining, by the base station, based on the information regarding unlicensed spectrum interference experienced by the UE, a severity of the unlicensed spectrum interference experienced by the UE. The method further includes taking corrective action, by the base station, based on the severity of the unlicensed spectrum interference experienced by the UE.

In an aspect, a wireless communication apparatus includes means for transmitting, by a base station, a channel state condition report request to a user equipment (UE). The apparatus additionally includes means for receiving, by the base station, a channel state condition report from a UE, wherein the channel state condition report includes information regarding unlicensed spectrum interference experienced by the UE. The apparatus also includes means for determining, by the base station, based on the information regarding unlicensed spectrum interference experienced by the UE, a severity of the unlicensed spectrum interference experienced by the UE. The apparatus further includes means for taking corrective action, by the base station, based on the severity of the unlicensed spectrum interference experienced by the UE.

In an aspect, a non-transitory computer-readable medium having program code recorded thereon. The program code includes code for causing one or more computers to transmit, by a base station, a channel state condition report request to a user equipment (UE). The program code additionally includes code for causing the one or more computers to receive, by the base station, a channel state condition report from a UE, wherein the channel state condition report includes information regarding unlicensed spectrum interference experienced by the UE. The program code also includes code for causing the one or more computers to determine, by the base station, based on the information regarding unlicensed spectrum interference experienced by the UE, a severity of the unlicensed spectrum interference experienced by the UE. The program code further includes code for causing the one or more computers to take corrective action, by the base station, based on the severity of the unlicensed spectrum interference experienced by the UE.

In an aspect, a base station includes at least one processor and a memory coupled to the at least one processor. The at least one processor is configured to transmit, by the base station, a channel state condition report request to a user equipment (UE). The at least one processor is additionally configured to receive, by the base station, a channel state condition report from a UE, wherein the channel state condition report includes information regarding unlicensed spectrum interference experienced by the UE. The at least one processor is also configured to determine, by the base station, based on the information regarding unlicensed spectrum interference experienced by the UE, a severity of the unlicensed spectrum interference experienced by the UE. The at least one processor is further configured to take corrective action, by the base station, based on the severity of the unlicensed spectrum interference experienced by the UE.

In an aspect, a method of wireless communication includes staggering within a radio frame, by a base station, at least one of Channel State Information Reference Signal (CSI-RS) resources or Interference Measurement Resource (IMR) resources at least one of across subframes or between slots within subframes. The method additionally includes transmitting, by the base station, the radio frame to a user equipment (UE).

In an aspect, a wireless communication apparatus includes means for staggering within a radio frame, by a base station, at least one of Channel State Information Reference Signal (CSI-RS) resources or Interference Measurement Resource (IMR) resources at least one of across subframes or between slots within subframes. The apparatus additionally includes means for transmitting, by the base station, the radio frame to a user equipment (UE).

In an aspect, a non-transitory computer-readable medium having program code recorded thereon. The program code includes code for causing one or more computers to stagger within a radio frame, by a base station, at least one of Channel State Information Reference Signal (CSI-RS) resources or Interference Measurement Resource (IMR) resources at least one of across subframes or between slots within subframes. The program code also includes code for causing the one or more computers to transmit, by the base station, the radio frame to a user equipment (UE).

In an aspect, a base station includes at least one processor and a memory coupled to the at least one processor. The at least one processor is configured to stagger within a radio frame, by a base station, at least one of Channel State Information Reference Signal (CSI-RS) resources or Interference Measurement Resource (IMR) resources at least one of across subframes or between slots within subframes. The at least one processor is additionally configured to transmit, by the base station, the radio frame to a user equipment (UE).

In an aspect, a method of wireless communication includes receiving, by a user equipment (UE), a radio frame from a base station, wherein the radio frame has at least one of Channel State Information Reference Signal (CSI-RS) or Interference Measurement Resource (IMR) resources staggered at least one of across subframes or between slots within subframes. The method additionally includes performing, by the UE, at least one of channel estimation or interference estimation based on the staggered at least one of CSI-RS or IMR resources.

In an aspect, a wireless communication apparatus includes means for receiving, by a user equipment (UE), a radio frame from a base station, wherein the radio frame has at least one of Channel State Information Reference Signal (CSI-RS) or Interference Measurement Resource (IMR) resources staggered at least one of across subframes or between slots within subframes. The apparatus additionally includes means for performing, by the UE, at least one of channel estimation or interference estimation based on the staggered at least one of CSI-RS or IMR resources.

In an aspect, a non-transitory computer-readable medium having program code recorded thereon. The program code includes code for causing one or more computers to receive, by a user equipment (UE), a radio frame from a base station, wherein the radio frame has at least one of Channel State Information Reference Signal (CSI-RS) or Interference Measurement Resource (IMR) resources staggered at least one of across subframes or between slots within subframes. The program code additionally includes code for causing one or more computers to perform, by the UE, at least one of channel estimation or interference estimation based on the staggered at least one of CSI-RS or IMR resources.

In an aspect, a user equipment (UE) includes at least one processor; and a memory coupled to the at least one processor. The at least one processor is configured to receive, by a user equipment (UE), a radio frame from a base station, wherein the radio frame has at least one of Channel State Information Reference Signal (CSI-RS) or Interference Measurement Resource (IMR) resources staggered at least one of across subframes or between slots within subframes. The at least one processor is additionally configured to perform, by the UE, at least one of channel estimation or interference estimation based on the staggered at least one of CSI-RS or IMR resources.

In an aspect, a method of wireless communication includes generating, by a user equipment (UE), one or more interference reports based on Channel State Information Reference Signal (CSI-RS) resources in a radio frame transmitted by a base station, wherein the one or more interference reports are based on unlicensed spectrum interference free CSI-RS resources and CSI-RS resources experiencing unlicensed spectrum interference. The method additionally includes transmitting, by the UE, the one or more interference reports to the base station.

In an aspect, a wireless communication apparatus includes means for generating, by a user equipment (UE), one or more interference reports based on Channel State Information Reference Signal (CSI-RS) resources in a radio frame transmitted by a base station, wherein the one or more interference reports are based on unlicensed spectrum interference free CSI-RS resources and CSI-RS resources experiencing unlicensed spectrum interference. The apparatus additionally includes means for transmitting, by the UE, the one or more interference reports to the base station.

In an aspect, a non-transitory computer-readable medium having program code recorded thereon. The program code includes code for causing one or more computers to generate, by a user equipment (UE), one or more interference reports based on Channel State Information Reference Signal (CSI-RS) resources in a radio frame transmitted by a base station, wherein the one or more interference reports are based on unlicensed spectrum interference free CSI-RS resources and CSI-RS resources experiencing unlicensed spectrum interference. The program code additionally includes code for causing the one or more computers to transmit, by the UE, the one or more interference reports to the base station.

In an aspect, a user equipment (UE) includes at least one processor a memory coupled to the at least one processor. The at least one processor is configured to generate, by the UE, one or more interference reports based on Channel State Information Reference Signal (CSI-RS) resources in a radio frame transmitted by a base station, wherein the one or more interference reports are based on unlicensed spectrum interference free CSI-RS resources and CSI-RS resources experiencing unlicensed spectrum interference. The at least one processor is additionally configured to transmit, by the UE, the one or more interference reports to the base station.

In an aspect, a method of wireless communications includes receiving, by a base station, one or more interference reports from a user equipment, wherein the one or more interference reports are based on Channel State Information Reference Signal (CSI-RS) resources in a radio frame transmitted by the base station, and wherein the one or more interference reports are based on unlicensed spectrum interference free CSI-RS resources and CSI-RS resources experiencing unlicensed spectrum interference. the method additionally includes employing, by the base station, the one or more interference reports to determine interference levels. The method also includes allocating, by the base station, resources to the UE based on the determined interference levels.

In an aspect, a wireless communication apparatus includes means for receiving, by a base station, one or more interference reports from a user equipment, wherein the one or more interference reports are based on Channel State Information Reference Signal (CSI-RS) resources in a radio frame transmitted by the base station, and wherein the one or more interference reports are based on unlicensed spectrum interference free CSI-RS resources and CSI-RS resources experiencing unlicensed spectrum interference. The apparatus additionally includes means for employing, by the base station, the one or more interference reports to determine interference levels. The apparatus also includes means for allocating, by the base station, resources to the UE based on the determined interference levels.

In an aspect, a non-transitory computer-readable medium having program code recorded thereon. The program code includes code for causing one or more computers to receiving, by a base station, one or more interference reports from a user equipment, wherein the one or more interference reports are based on Channel State Information Reference Signal (CSI-RS) resources in a radio frame transmitted by the base station, and wherein the one or more interference reports are based on unlicensed spectrum interference free CSI-RS resources and CSI-RS resources experiencing unlicensed spectrum interference. The program code additionally includes code for causing the one or more computers to employing, by the base station, the one or more interference reports to determine interference levels. The program code also includes code for causing the one or more computers to allocating, by the base station, resources to the UE based on the determined interference levels.

In an aspect, a base station includes at least one processor a memory coupled to the at least one processor. The at least one processor is configured to receive, by the base station, one or more interference reports from a user equipment, wherein the one or more interference reports are based on Channel State Information Reference Signal (CSI-RS) resources in a radio frame transmitted by the base station, and wherein the one or more interference reports are based on unlicensed spectrum interference free CSI-RS resources and CSI-RS resources experiencing unlicensed spectrum interference. The at least one processor is additionally configured to employ, by the base station, the one or more interference reports to determine interference levels. The at least one processor is also configured to allocate, by the base station, resources to the UE based on the determined interference levels.

In an aspect, a method of wireless communication includes determining, by a user equipment (UE), a severity of unlicensed spectrum interference experienced by the UE. The method additionally includes generating, by the UE, a Channel State Information report that includes a request to switch the UE from a current one of channel or band to a different one of channel or band. The method also includes transmitting, by the UE, the CSI report to a base station.

In an aspect, a wireless communication apparatus includes means for determining, by a user equipment (UE), a severity of unlicensed spectrum interference experienced by the UE. The apparatus additionally includes means for generating, by the UE, a Channel State Information report that includes a request to switch the UE from a current one of channel or band to a different one of channel or band. The apparatus also includes means for transmitting, by the UE, the CSI report to a base station.

In an aspect, a non-transitory computer-readable medium having program code recorded thereon. The program code includes code for causing one or more computers to determine, by a user equipment (UE), a severity of unlicensed spectrum interference experienced by the UE. The program code additionally includes code for causing the one or more computers to generate, by the UE, a Channel State Information report that includes a request to switch the UE from a current one of channel or band to a different one of channel or band. The program code also includes code for causing the one or more computers to transmit, by the UE, the CSI report to a base station.

In an aspect, a user equipment (UE) includes at least one processor and a memory coupled to the at least one processor. The at least one processor is configured to determine, by the UE, a severity of unlicensed spectrum interference experienced by UE. The at least one processor is additionally configured to generate, by the UE, a Channel State Information report that includes a request to switch the UE from a current one of channel or band to a different one of channel or band. The at least one processor is also configured to transmit, by the UE, the CSI report to a base station.

In an aspect, a method of wireless communication includes performing, by a base station, wireless communications with a user equipment (UE) over a current one of channel or band. The method additionally includes receiving, by the base station, a Channel State Information report from the UE, wherein the Channel State Information report includes a request to switch the UE from the current one of channel or band to a different one of channel or band. The method also includes transmitting, by the base station, a command for the UE to switch to the different one of channel or band.

In an aspect, a wireless communication apparatus includes means for performing, by a base station, wireless communications with a user equipment (UE) over a current one of channel or band. The apparatus additionally includes means for receiving, by the base station, a Channel State Information report from the UE, wherein the Channel State Information report includes a request to switch the UE from the current one of channel or band to a different one of channel or band. The apparatus also includes means for transmitting, by the base station, a command for the UE to switch to the different one of channel or band.

In an aspect, a non-transitory computer-readable medium having program code recorded thereon. The program code includes code for causing one or more computers to perform, by a base station, wireless communications with a user equipment (UE) over a current one of channel or band. The program code additionally includes code for causing the one or more computers to receive, by the base station, a Channel State Information report from the UE, wherein the Channel State Information report includes a request to switch the UE from the current one of channel or band to a different one of channel or band. The program code also includes code for causing the one or more computers to transmit, by the base station, a command for the UE to switch to the different one of channel or band.

In an aspect, a base station includes at least one processor and a memory coupled to the at least one processor. The at least one processor is configured to perform, by the base station, wireless communications with a user equipment (UE) over a current one of channel or band. The at least one processor is additionally configured to receive, by the base station, a Channel State Information report from the UE, wherein the Channel State Information report includes a request to switch the UE from the current one of channel or band to a different one of channel or band. The at least one processor is also configured to transmit, by the base station, a command for the UE to switch to the different one of channel or band.

In an aspect, a method of wireless communication includes performing, by a user equipment (UE), wireless communication with a base station on a first band. The method additionally includes transmitting, by the UE, at least one of an acknowledgement (ACK) or a Channel State information (CSI) report to the base station on a second band.

In an aspect, a wireless communication apparatus includes means for performing, by a user equipment (UE), wireless communication with a base station on a first band. The apparatus additionally includes means for transmitting, by the UE, at least one of an acknowledgement (ACK) or a Channel State information (CSI) report to the base station on a second band.

In an aspect, a non-transitory computer-readable medium having program code recorded thereon. The program code includes code for causing one or more computers to perform, by a user equipment (UE), wireless communication with a base station on a first band. The program code additionally includes code for causing the one or more computers to transmitting, by the UE, at least one of an acknowledgement (ACK) or a Channel State information (CSI) report to the base station on a second band.

In an aspect, a user equipment (UE) includes at least one processor and a memory coupled to the at least one processor. The at least one processor is configured to perform, by the UE, wireless communication with a base station on a first band. The at least one processor is additionally configured to transmit, by the UE, at least one of an acknowledgement (ACK) or a Channel State information (CSI) report to the base station on a second band.

In an aspect, a method of wireless communication includes performing, by a base station, wireless communication with a user equipment (UE) on a first band. The method additionally includes receiving, by the base station, at least one of an acknowledgement (ACK) or a Channel State Information (CSI) report from the UE on a second band. The method also includes adjusting communications with the UE on the first band based on the at least one of the ACK or the CSI report received from the UE on the second band.

In an aspect a wireless communication apparatus includes means for performing, by a base station, wireless communication with a user equipment (UE) on a first band. The apparatus additionally includes means for receiving, by the base station, at least one of an acknowledgement (ACK) or a Channel State Information (CSI) report from the UE on a second band. The apparatus also includes means for adjusting communications with the UE on the first band based on the at least one of the ACK or the CSI report received from the UE on the second band.

In an aspect, a non-transitory computer-readable medium having program code recorded thereon. The program code includes code for causing one or more computers to perform, by a base station, wireless communication with a user equipment (UE) on a first band. The program code additionally includes code for causing the one or more computers to receive, by the base station, at least one of an acknowledgement (ACK) or a Channel State Information (CSI) report from the UE on a second band. The program code also includes code for causing the one or more computers to adjust communications with the UE on the first band based on the at least one of the ACK or the CSI report received from the UE on the second band.

In an aspect, a base station includes at least one processor and a memory coupled to the at least one processor. The at least one processor is configured to perform, by the base station, wireless communication with a user equipment (UE) on a first band. The at least one processor is additionally configured to receive, by the base station, at least one of an acknowledgement (ACK) or a Channel State Information (CSI) report from the UE on a second band. The at least one processor is also configured to adjust communications with the UE on the first band based on the at least one of the ACK or the CSI report received from the UE on the second band.

DETAILED DESCRIPTION

Figure 1:
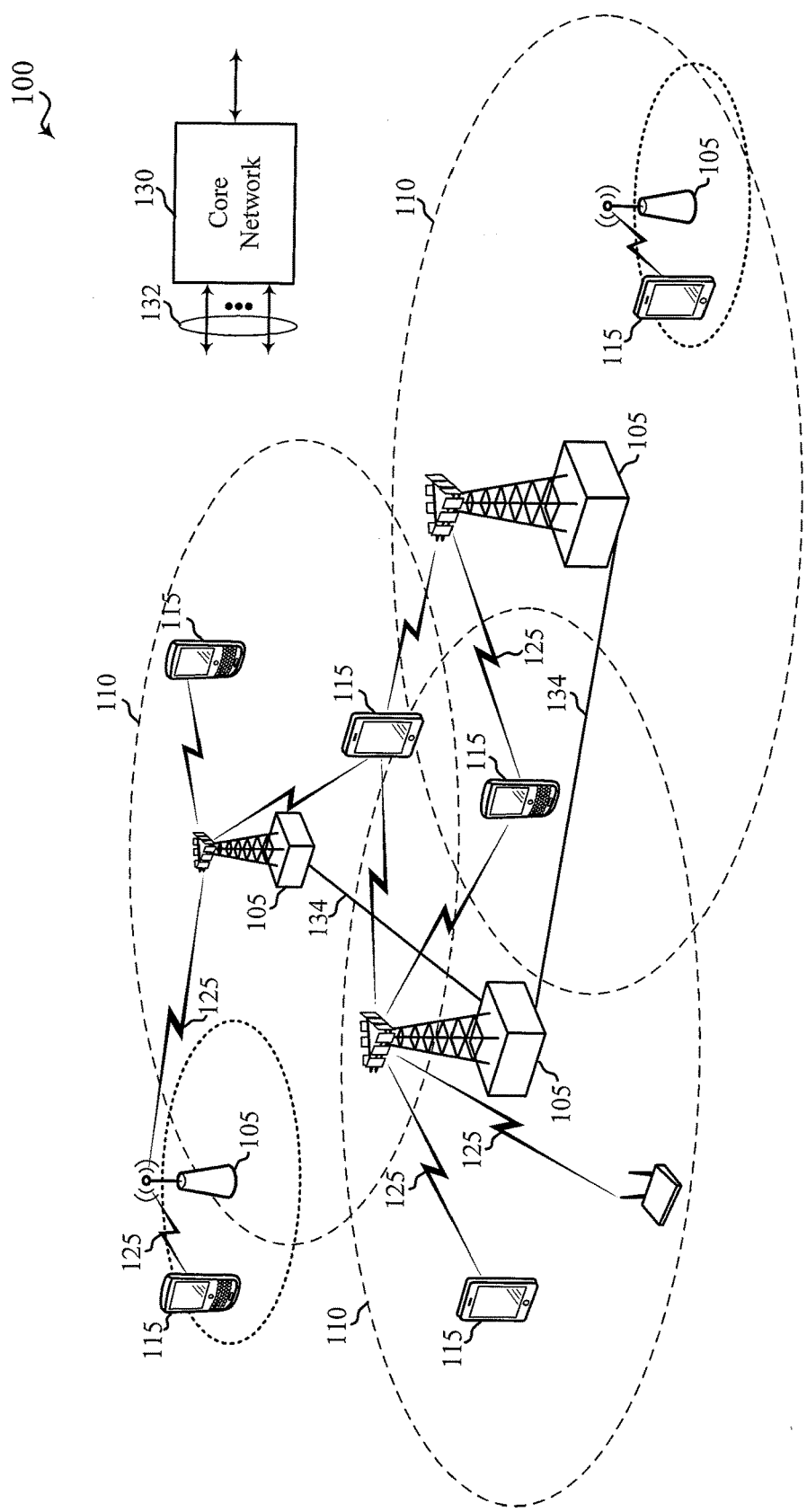
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WIFI as the primary mechanism to use unlicensed spectrum to relieve ever increasing levels of congestion in cellular networks. However, a new carrier type (NCT) based on LTE in an unlicensed spectrum (LTE/LTE-A with unlicensed spectrum) may be compatible with carrier-grade WIFI, making LTE/LTE-A with unlicensed spectrum an alternative to WIFI. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WIFI. For example, an all LTE/LTE-A with deployment with unlicensed spectrum (for single or multiple operators) compared to an all WIFI deployment, or when there are dense small cell deployments, LTE/LTE-A with unlicensed spectrum may perform significantly better than WIFI. LTE/LTE-A with unlicensed spectrum may perform better than WIFI in other scenarios such as when LTE/LTE-A with unlicensed spectrum is mixed with WIFI (for single or multiple operators).

For a single service provider (SP), an LTE/LTE-A network on an unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A with and without unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode in which LTE cells act as anchor and provide relevant cell information (e.g., radio frame timing, common channel configuration, system frame number or SFN, etc.). In this mode, there may be close interworking between LTE/LTE-A with and without unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network. In this case, there may be a loose interworking between LTE/LTE-A with and without unlicensed spectrum based on RLC-level aggregation with co-located cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more unlicensed spectrum modes of operation or deployment scenarios. In other embodiments, the system 100 may support wireless communications using an unlicensed spectrum and an access technology different from LTE/LTE-A, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with or without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum (e.g., LTE), an unlicensed spectrum, or both. Similarly, the uplink transmissions may be made using a licensed spectrum (e.g., LTE), an unlicensed spectrum, or both.

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A deployment scenarios or modes of operation with unlicensed spectrum in a system such as the system 100, as well as other features and functions related to the operation of LTE/LTE-A with unlicensed spectrum, are provided below with reference to FIGS. 2A-19.

Figure 2A:
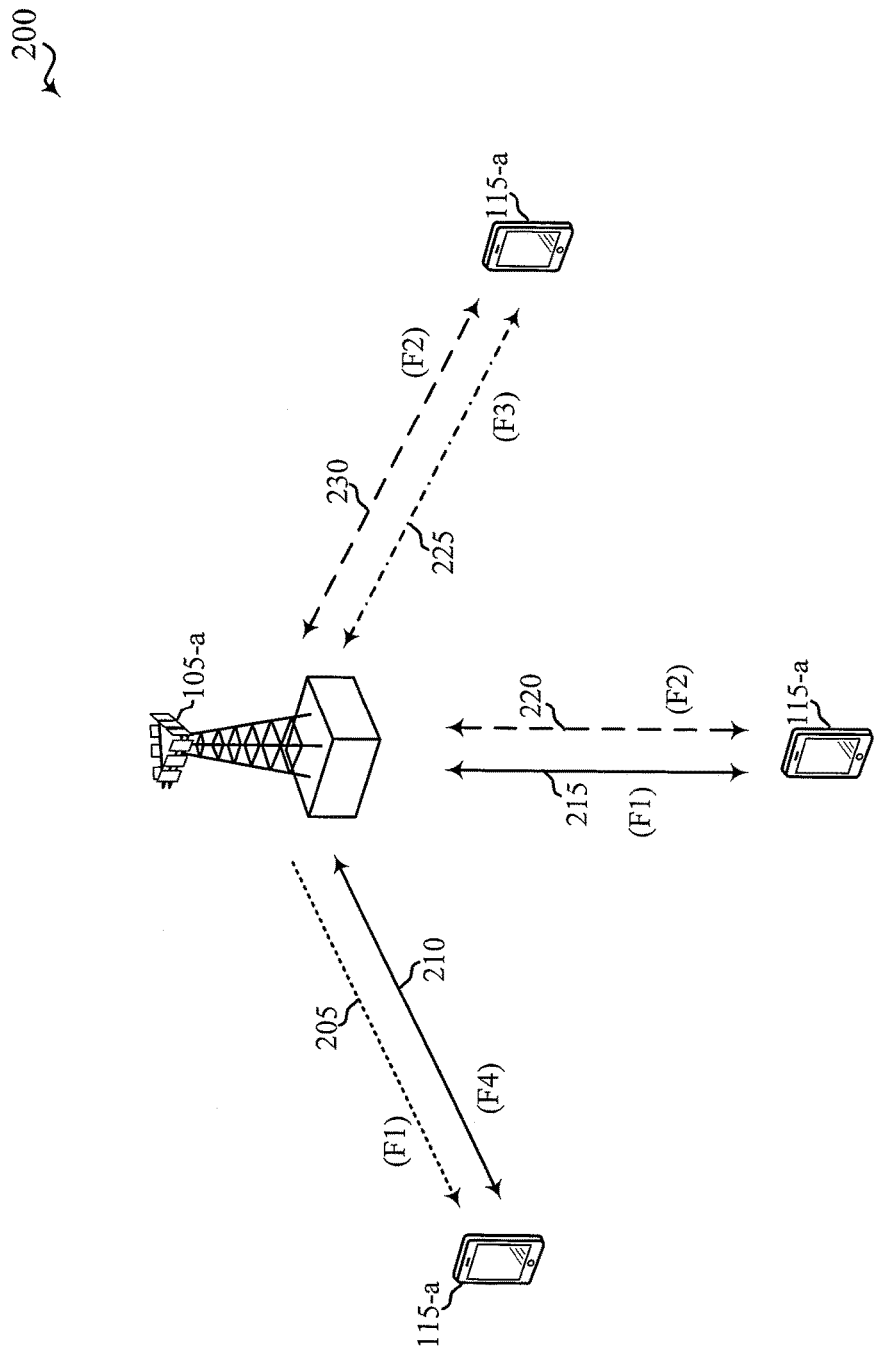
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports communications over unlicensed spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with and without unlicensed spectrum for capacity offload.

As described above, the typical service provider that may benefit from the capacity offload offered by using LTE/LTE-A in an unlicensed band is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the secondary component carrier (SCC) on the unlicensed spectrum.

In the supplemental downlink mode, control for LTE/ LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated over an unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
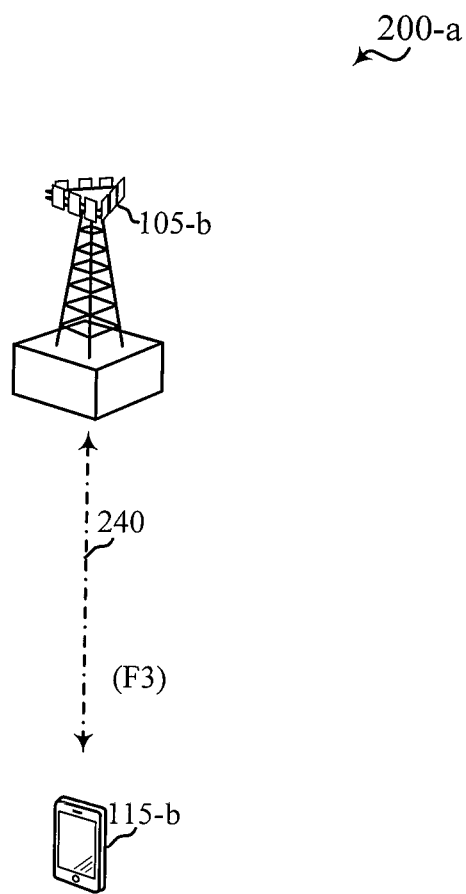
FIG. 2B shows a diagram that illustrates another example of a deployment scenario for using LTE in an unlicensed spectrum according to various embodiments.

FIG. 2B shows a diagram 200-a that illustrates an example of a standalone mode for LTE/LTE-A with unlicensed spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-b using a bidirectional link 240 and may receive SC-FDMA communications signals from the UE 115-b using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the LTE/LTE-A with unlicensed spectrum PCC on the unlicensed spectrum. Moreover, LBT may be implemented on both the base station and the UE.

Figure 3:
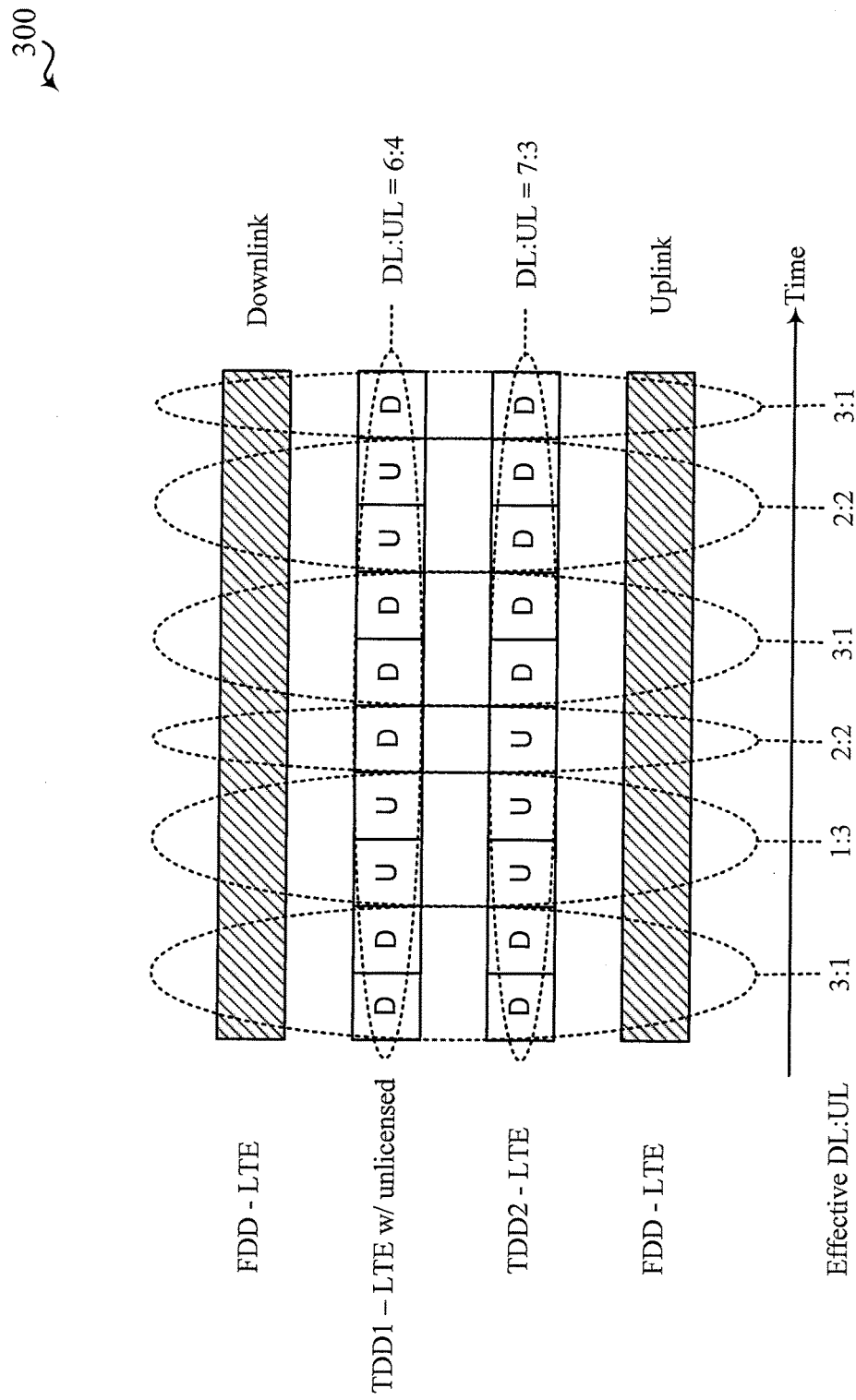
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-a of FIG. 1 and FIG. 2A, respectively, and/or in the UEs 115 and 115-a of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE, and another FDD (FDD-LTE) may be performed in connection with LTE in the uplink. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with and without unlicensed spectrum.

Figure 4:
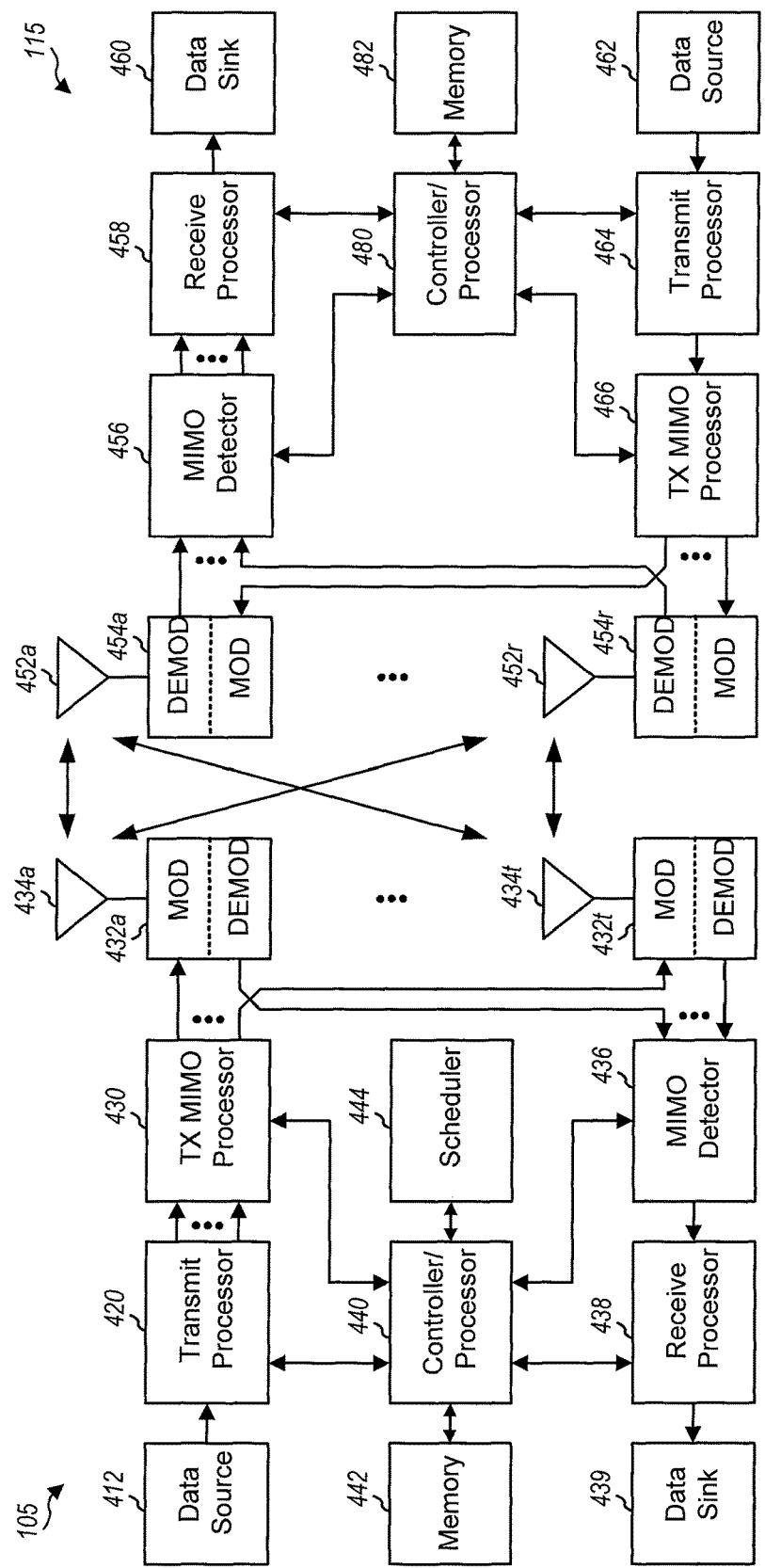
FIG. 4 is a block diagram conceptually illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434a through 434t, and the UE 115 may be equipped with antennas 452a through 452r. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452a through 452r may receive the downlink signals from the eNB 105 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 6-9, 11-16, 18, and 19, and/or other processes for the techniques described herein. The memories 442 and 482 may store data and program codes for the eNB 105 and the UE 115, respectively. A scheduler 444 may schedule UEs for data transmission on the downlink and/or uplink.

As may be appreciated from the foregoing descriptions, LTE/LTE-A with unlicensed spectrum may experience bursty interference from unlicensed spectrum nodes, such as WIFI nodes. This bursty interference may result in time-varying interference in each subframe. As a result, signal to interference plus noise ratio (SINR) per code block may vary significantly. The present disclosure is directed to various enhancements in acknowledgement (ACK), non-acknowledgment (NAK), and channel quality indicator (CQI) reporting to enable eNBs to better manage bursty interference. Throughout the remainder of this disclosure, WIFI interference is referred to as an example type of unlicensed spectrum interference. However, it should be understood that the enhancements disclosed herein may be employed for other types of unlicensed spectrum interference.

FIGS. 5A-5E provide examples illustrating ACK/NAK reporting enhancements in accordance with the present disclosure. In these example, a base station 500 sends a transmission to a UE 504, and the UE 504 replies with an ACK or NAK that may contain one or more additional bits to indicate whether unlicensed spectrum interference, such as WIFI interference, is present during a subframe, and/or whether failure to decode a subframe is likely a result of presence of WIFI interference. In the examples set forth below, the ACK/NAK message may be provided with up to two extra bits, including a WIFI Interference Indicator (WII) bit and a Speculative ACK bit. The WII bit may be used to indicate whether WIFI interference was present during a subframe, whereas the Speculative ACK bit may be used indicate whether failure to decode a subframe is likely a result of presence of WIFI interference. With this information, which may be provided every subframe or periodically, the base station 500 may distinguish between a NAK due to WIFI interference and a NAK due to other reasons, such as fading or path loss, for example. The base station 500 may also determine the impact of the WIFI interference on subframe decoding. Accordingly, the base station 500 may accumulate WIFI interference information over time and make intelligent decisions based on the frequency of the interference, whether the interference is bursty in nature, and whether the interference severely impacts communications performance with the UE. Example operations carried out by the UE 504 and base station 500 are described in greater detail below with reference to FIGS. 6 and 7, respectively.

Figure 5A:
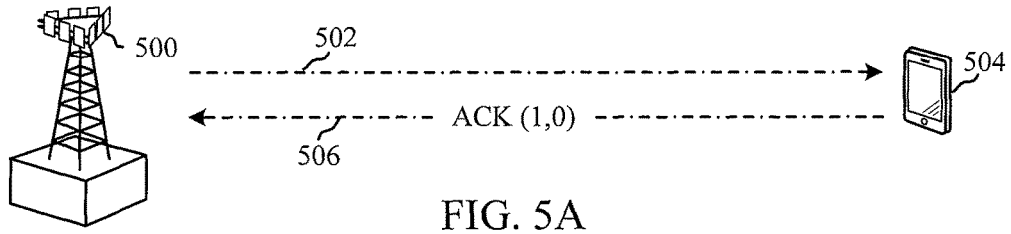
FIG. 5A shows a diagram that illustrates a first example of ACK/NAK reporting enhancement according to an aspect of the present disclosure.

FIG. 5A shows a diagram that illustrates a first example of ACK/NAK reporting enhancement according to an aspect of the present disclosure. In this example, UE 504 is able to successfully decode a transmitted subframe 502 from base station 500. UE 504 also determines that WIFI interference is not present during the subframe. UE 504 may, therefore, transmit an ACK 506 to base station 500 that has the ACK bit set to one to indicate successful decoding of the subframe. In accordance with the present disclosure, UE 504 may also include in the ACK 506 a WIFI Interference Indicator (WII) bit set to zero to indicate that WIFI interference was not present during the subframe.

Figure 5B:
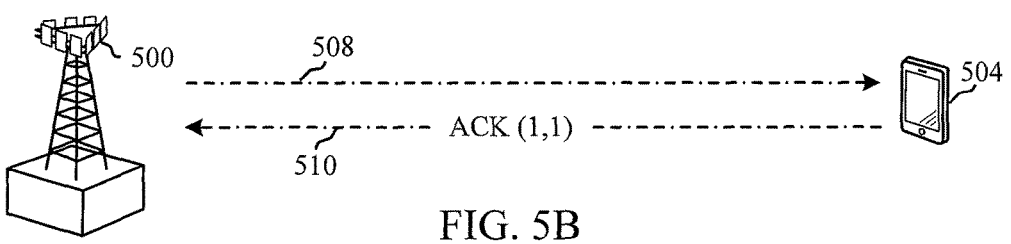
FIG. 5B shows a diagram that illustrates a second example of ACK/NAK reporting enhancement according to an aspect of the present disclosure.

FIG. 5B shows a diagram that illustrates a second example of ACK/NAK reporting enhancement according to an aspect of the present disclosure. In this example, UE 504 is again able to successfully decode a transmitted subframe 508 from base station 500. UE 504 also determines that WIFI interference is present during the subframe. UE 504 may, therefore, transmit an ACK 510 to base station 500 that has the ACK bit set to one to indicate successful decoding of the subframe. In accordance with the present disclosure, UE 504 may also include in the ACK 510 a WII bit set to one to indicate that WIFI interference was present during the subframe.

Figure 5C:
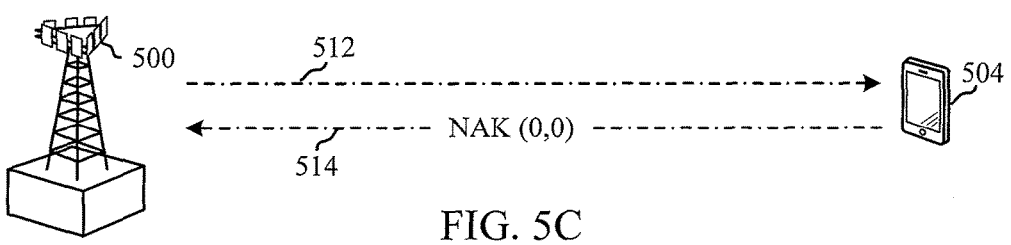
FIG. 5C shows a diagram that illustrates a third example of ACK/NAK reporting enhancement according to an aspect of the present disclosure.

FIG. 5C shows a diagram that illustrates a third example of ACK/NAK reporting enhancement according to an aspect of the present disclosure. In this example, UE 504 is unable to successfully decode a transmitted subframe 512 from base station 500. UE 504 also determines that WIFI interference is not present during the subframe. UE 504 may, therefore, transmit a NAK 514 to base station 500 that has the ACK bit set to zero to indicate unsuccessful decoding of the subframe. In accordance with the present disclosure, UE 504 may also include in the NAK 514 a WII bit set to zero to indicate that WIFI interference was not present during the subframe.

Figure 5D:
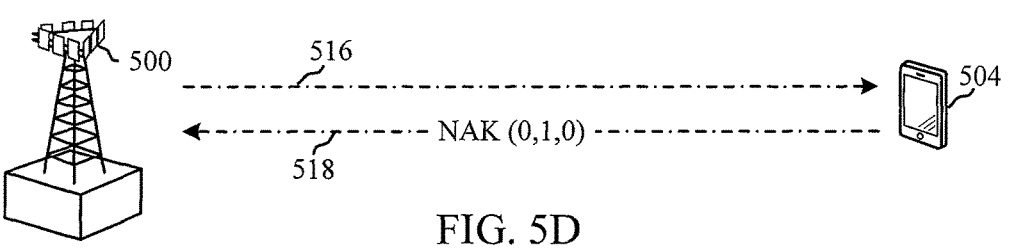
FIG. 5D shows a diagram that illustrates a fourth example of ACK/NAK reporting enhancement according to an aspect of the present disclosure.

FIG. 5D shows a diagram that illustrates a fourth example of ACK/NAK reporting enhancement according to an aspect of the present disclosure. In this example, UE 504 is unable to successfully decode a transmitted subframe 516 from base station 500. UE 504 also determines that WIFI interference is present during the subframe, and that the failure to decode the subframe is likely not due to the presence of WIFI interference. UE 504 may, therefore, transmit a NAK 518 to base station 500 that has the ACK bit set to zero to indicate unsuccessful decoding of the subframe. In accordance with the present disclosure, UE 504 may also include in the NAK 518 a WII bit set to one to indicate that WIFI interference was present during the subframe, and a Speculative ACK bit set to zero to indicate that the failure to decode the subframe is likely not due to the presence of WIFI interference.

Figure 5E:
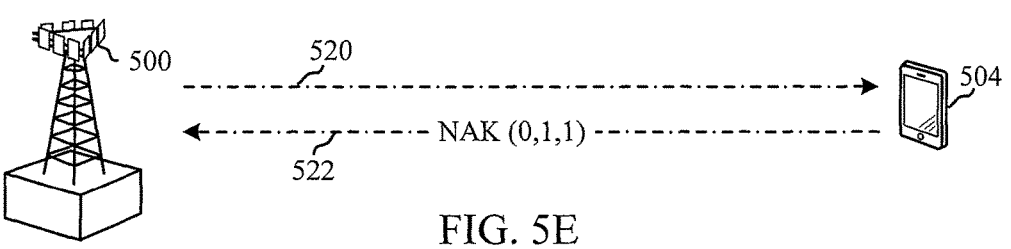
FIG. 5E shows a diagram that illustrates a fifth example of ACK/NAK reporting enhancement according to an aspect of the present disclosure.

FIG. 5E shows a diagram that illustrates a fifth example of ACK/NAK reporting enhancement according to an aspect of the present disclosure. In this example, UE 504 is unable to successfully decode a transmitted subframe 520 from base station 500. UE 504 also determines that WIFI interference is present during the subframe, and that the failure to decode the subframe is likely due to the presence of WIFI interference. UE 504 may, therefore, transmit a NAK 522 to base station 500 that has the ACK bit set to zero to indicate unsuccessful decoding of the subframe. In accordance with the present disclosure, UE 504 may also include in the NAK 522 a WII bit set to one to indicate that WIFI interference was present during the subframe, and a Speculative ACK bit set to one to indicate that the failure to decode the subframe is likely due to the presence of WIFI interference.

Figure 5F:
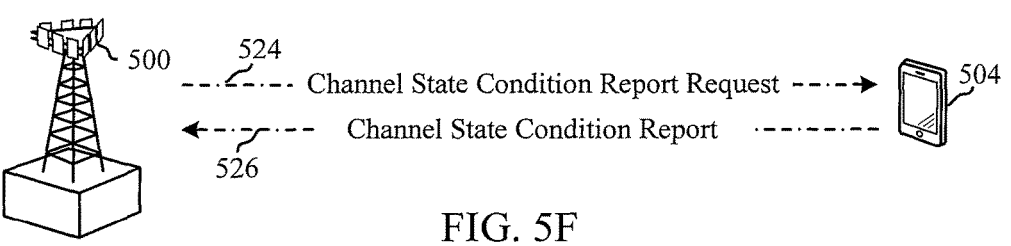
FIG. 5F shows a diagram that illustrates another example of reporting enhancements according to an aspect of the present disclosure.

FIG. 5F shows a diagram that illustrates another example of reporting enhancements according to an aspect of the present disclosure. In this example, the base station 500 may be preparing to send a transmission to base station 504. In anticipation of this transmission, the base station 500 may transmit a Channel State Condition report request 524 to the UE 504. The UE 504 may replay with a channel state condition report 526 that contains information regarding WIFI interference experienced by the UE 504. It is envisioned that the base station 500 may request such a report periodically in anticipation of future transmissions, and accumulate this information over time. Alternatively, it is envisioned that the UE 504 may periodically measure channel conditions and accumulate the WIFI interference information over time. In this alternative, the report 526 may include the information accumulated by the UE 504 over time. Example operations carried out by the base station 500 and UE 504 are described in greater detail below with respect to FIGS. 8 and 9, respectively.

Figure 6:
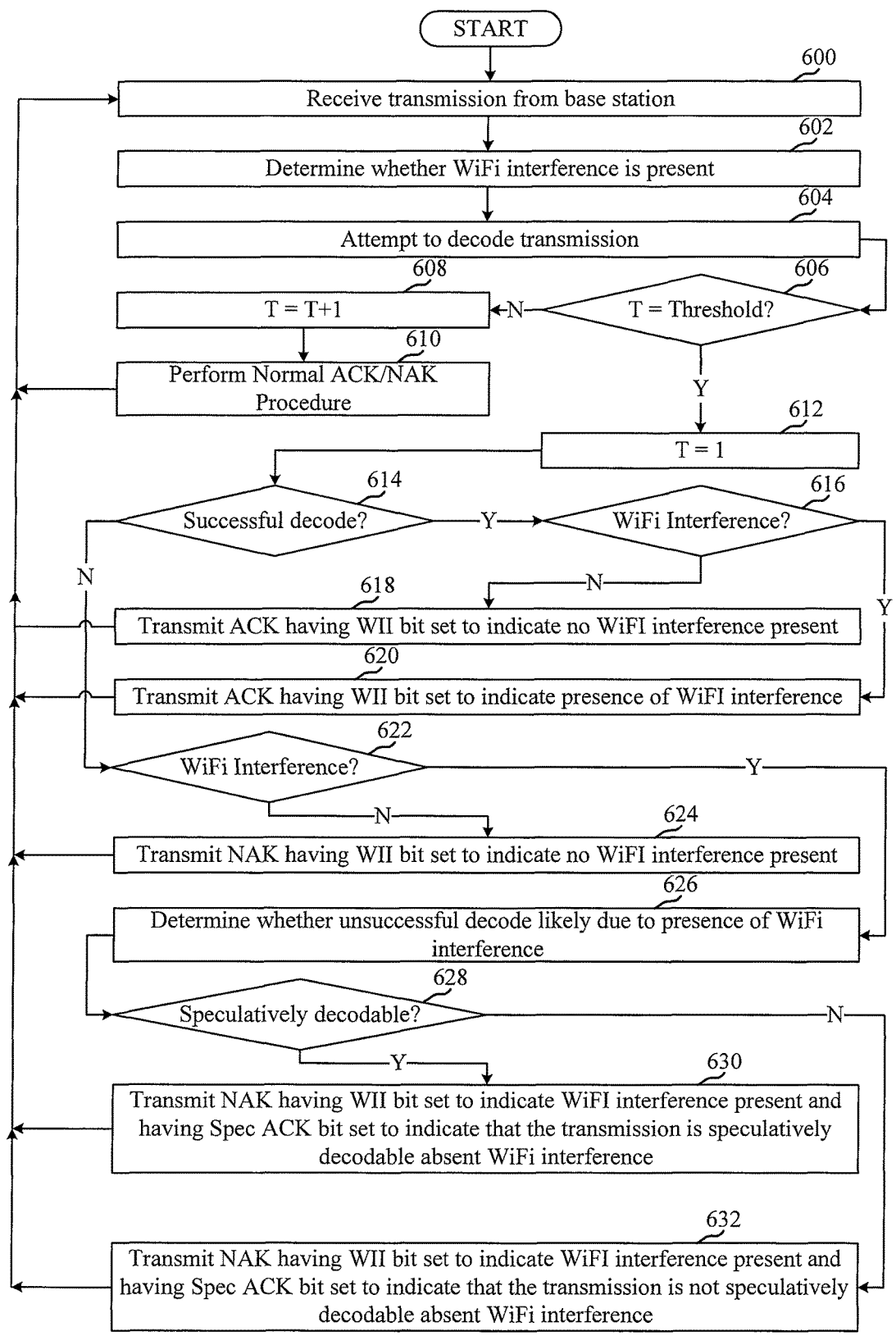
FIG. 6 shows a diagram that illustrates example blocks executed by a user equipment during an enhanced ACK/NAK reporting process according to an aspect of the present disclosure.

FIG. 6 shows a diagram that illustrates example blocks executed by a user equipment during an enhanced ACK/NAK reporting process according to an aspect of the present disclosure. For example, beginning at block 600, the UE may receive a transmission of a subframe from a base station. Additionally, at block 602, the UE may determine whether unlicensed spectrum interference, such as WIFI interference, is present. Also, at block 604, the UE may attempt to decode the subframe. Further, in some aspects implementing periodic reporting, a determination may be made by the UE, at block 606, whether a predefined period of time has passed. For example, a counter may be compared, at block 606, to a threshold received from a higher layer. If it is determined, at block 606, that the predetermined period of time has not passed, then the counter may be incremented at block 608, and a normal ACK/NAK procedure may be carried out at block 610. Processing may return from block 610 to a previous point in the process, such as block 600. However, if it is determined, at block 606, that the predetermined period of time has passed, then the counter may be reset at block 612, and processing may proceed to block 614. It is envisioned that the reporting may alternatively be carried out aperiodically or continuously, such as for every subframe.

At block 614, a determination may be made whether the subframe was successfully decoded. If it is determined, at block 614, that the subframe was successfully decoded, then a further determination may be made, at block 616, whether WIFI interference was determined, at block 602, to be present during the transmission of the successfully decoded subframe. If it is determined, at block 616, that WIFI interference was not present, then the UE may transmit, at block 618, an ACK to the base station that has a WII bit set to zero indicate that no WIFI interference was present. However, if it is determined, at block 616, that WIFI interference was present, then the UE may transmit, at block 620, an ACK to the base station that has a WII bit set to one to indicate presence of WIFI interference. Processing may return from blocks 618 and 620 to an earlier point in the process, such as block 600. However, if it is determined, at block 614, that the subframe could not be successfully decoded, then processing may proceed from block 614 to block 622.

At block 622, a determination may be made whether WIFI interference was determined, at block 602, to be present during the transmission of the unsuccessfully decoded subframe. If it is determined, at block 622, that WIFI interference was not present, then the UE may transmit, at block 624, a NAK to the base station that has a WII bit set to zero to indicate that WIFI interference was not present. Processing may return from block 624 to an earlier point in the process, such as block 600. However, if it is determined, at block 622, that WIFI interference was present, then processing may proceed from block 622 to block 626.

At block 626, the UE may determine whether the failure to successfully decode the subframe was likely due to the presence of the WIFI interference. For example, the UE may perform an analysis regarding noise ratio estimates and/or predefined Short Term (ST) curves, and make the determination at block 626 based on the analysis. In this regard, ST curves may be used in simulations to determine the minimum SNR to achieve 10% subframe error rate. These ST curves may vary with the modulation and coding scheme used, channel conditions, decoder used, and other factors. Processing may proceed from block 626 to block 628.

At block 628, if it is determined that the failure to successfully decode the subframe was likely not due to the presence of the WIFI interference, then the UE may transmit, at block 630, a NAK having a WII bit set to one to indicate presence of WIFI interference, and having a Speculative ACK bit set to one to indicate that the subframe is speculatively decodable absent the WIFI interference. However, if the UE determines, at block 628, that the failure to successfully decode the subframe was likely not due to the presence of the WIFI interference, then the UE may transmit, at block 632, a NAK having a WII bit set to one to indicate presence of WIFI interference, and having a Speculative ACK bit set to zero to indicate that the subframe is not speculatively decodable absent the WIFI interference. Processing may return from block 630 and block 632 to an earlier point in the process, such as block 600.

Figure 7:
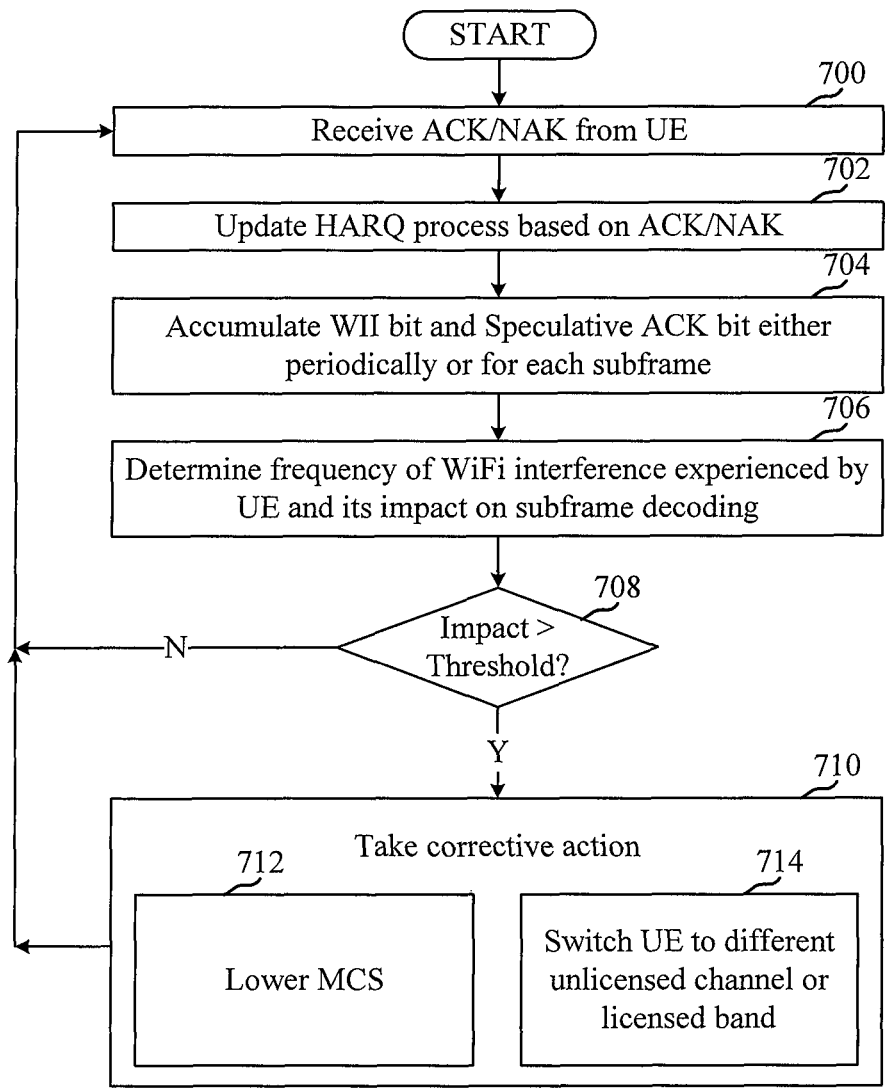
FIG. 7 shows a diagram that illustrates example blocks executed by a base station during an enhanced ACK/NAK reporting process according to an aspect of the present disclosure.

FIG. 7 shows a diagram that illustrates example blocks executed by a base station during an enhanced ACK/NAK reporting process according to an aspect of the present disclosure. Beginning at block 700, the base station may receive an ACK/NAK from a UE and, at block 702, update a Hybrid Automatic Repeat Request (HARQ) process based on the ACK/NAK bit in a manner that will be readily understood by one skilled in the art. At block 704, the base station may accumulate the WII bit and Speculative ACK bit either periodically or for each subframe. At block 706, the base station may employ the accumulated information to determine frequency of unlicensed spectrum interference, such as WIFI interference, experienced by the UE and its impact on subframe decoding. For example, it is envisioned that the base station may observe a WIFI interference rate based on the accumulated WII bits, and distinguish bursty interference based on the accumulated Speculative ACK bits. The impact measure may be compared to a threshold, at block 708, to determine whether the impact of the WIFI interference is sufficiently severe to warrant taking of corrective action at block 710. For example, if several subframes are in error due to WIFI interference, then the base station may, at block 712, lower a modulation and coding scheme (MCS) to compensate for bursty interference. Alternatively, the base station may, at block 714, switch the UE to a different unlicensed channel or licensed band in response to indication of presence of WIFI interference. For example, a switch may be performed if the MCS cannot be lowered any further.

Figure 8:
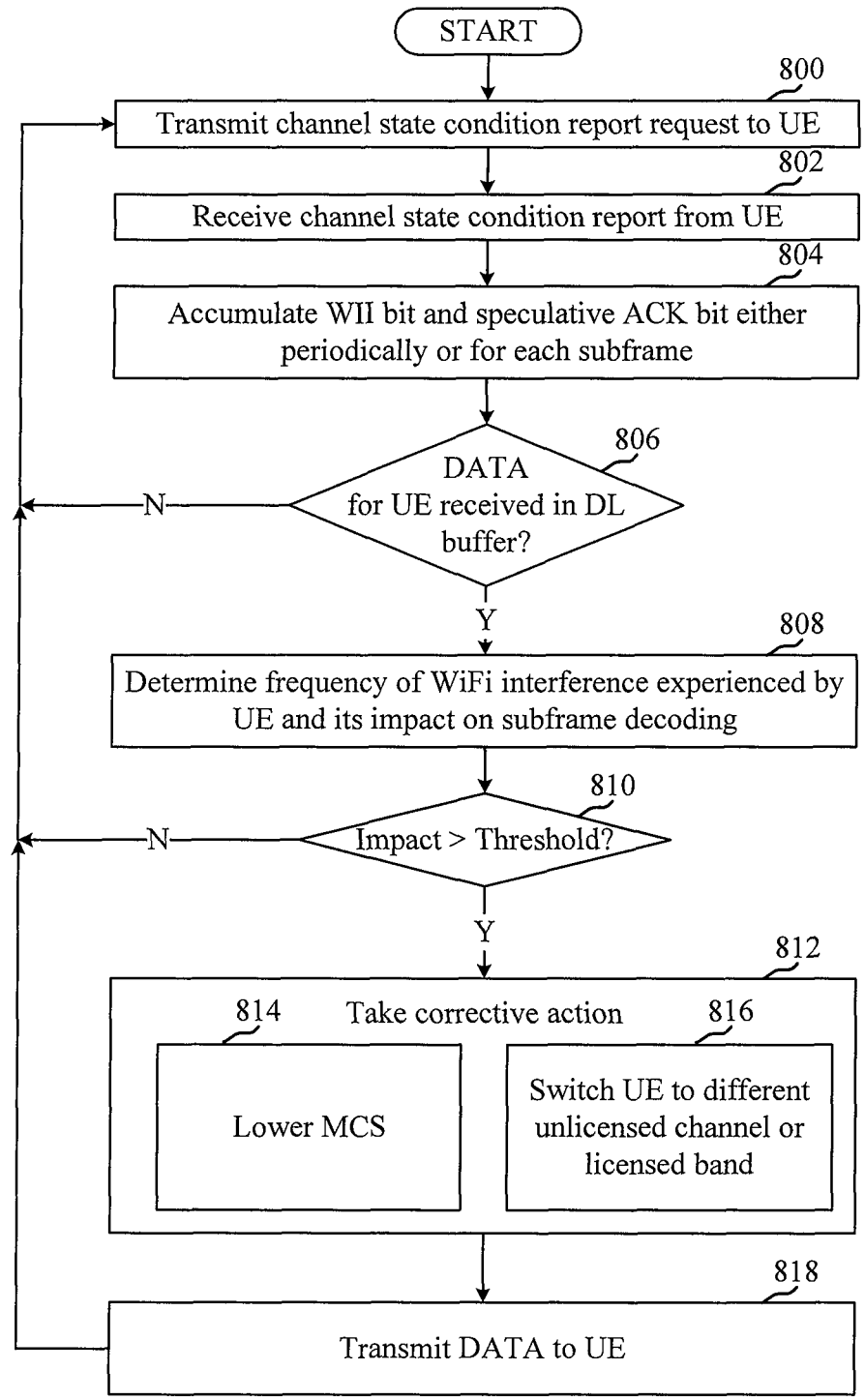
FIG. 8 shows a diagram that illustrates example blocks executed by a base station during a channel state condition reporting process according to an aspect of the present disclosure.

FIG. 8 shows a diagram that illustrates example blocks executed by a base station during a channel state condition reporting process according to an aspect of the present disclosure. For example, beginning at block 800, the base station may transmit a channel state condition report request to a UE. It is envisioned that the base station may transmit this request in anticipation of a future transmission, and that it may be performed periodically or aperiodically. Additionally, at block 802, the base station may receive the channel state condition report from the UE. It is envisioned that this report may contain a WII bit and/or Speculative ACK bit as previously described. In some aspects, these bits may indicate conditions experienced by the UE at times when no subframe is received from the base station. For example, the Speculative ACK bit may indicate whether the UE would likely fail to decode one or more transmissions as a result of the presence of unlicensed spectrum interference, such as WIFI interference. Alternatively or additionally, it is envisioned that the report may contain WII and Speculative ACK bit information accumulated over time by the UE in anticipation of the request. In the event that the base station is responsible for accumulating the interference information over time, the base station may, at block 804, accumulate the WII bit and Speculative ACK bit over time, either periodically, aperiodically, or continuously. Processing may proceed from block 804 to block 806.

At block 806, the base station may make a determination whether data destined for the UE has arrived in a downlink buffer. If it is determined at block 806, that no data is to be transmitted to the UE, then processing may return to an earlier point in the process, such as block 800. However, if it is determined, at block 806, that data needs to be transmitted to the UE, then the base station may, at block 808, employ the accumulated WIFI interference information to determine frequency of WIFI interference experienced by the UE and its impact on subframe decoding. For example, it is envisioned that the base station may observe a WIFI interference rate based on the accumulated WII bits, and distinguish bursty interference based on the accumulated Speculative ACK bits. The impact measure may be compared to a threshold, at block 810, to determine whether the impact of the WIFI interference is sufficiently severe to warrant taking of corrective action at block 812. If the impact is determined, at block 810, not to be severe, then processing may return to an earlier point in the process, such as block 800. However, if it is determined at block 810 that the impact is severe, then corrective action may be taken at block 812. For example, if several subframes are in error due to WIFI interference, then the base station may, at block 814, lower a modulation and coding scheme (MCS) to compensate for bursty interference. Alternatively, the base station may, at block 816, switch the UE to a different unlicensed channel or licensed band in response to indication of presence of WIFI interference. For example, a switch may be performed if the MCS cannot be lowered any further. Following taking of corrective action at block 812, the base station may transmit the data to the UE at block 818. Processing may return from block 818 to an earlier point in the process, such as block 800.

Figure 9:
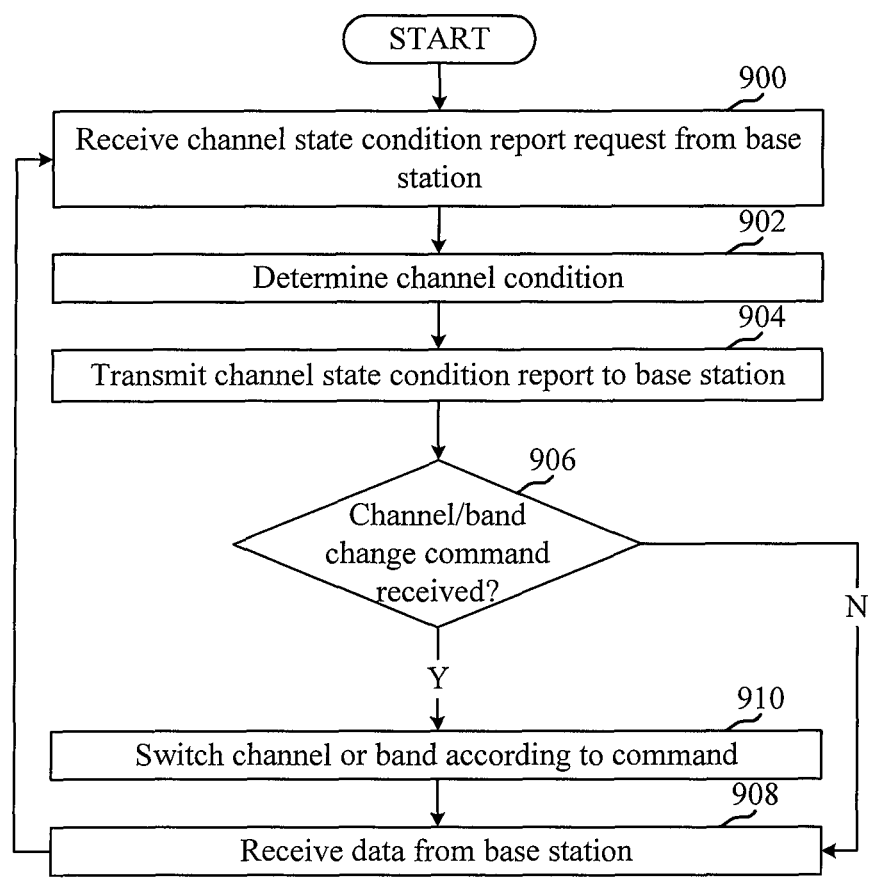
FIG. 9 shows a diagram that illustrates example blocks executed by a user equipment during a channel state condition reporting process according to an aspect of the present disclosure.

FIG. 9 shows a diagram that illustrates example blocks executed by a user equipment during a channel state condition reporting process according to an aspect of the present disclosure. For example, beginning at block 900, the UE may receive a channel state condition report request from a base station. Additionally, in response to the request received at block 900, the UE may determine a channel condition at block 902, and transmit the channel state condition report to the base station at block 904. In accordance with aspects of the present disclosure, the report may contain information regarding unlicensed spectrum interference, such as WIFI interference, experienced by the UE. In some aspects, it is envisioned that the information regarding the WIFI interference may include information regarding the presence of the WIFI interference, such as one or more WII bits as previously described. Alternatively or additionally, it is envisioned that the UE may determine, at block 902, whether the UE would likely fail to decode one or more transmissions as a result of the presence of the WIFI interference. In these aspects, information regarding the WIFI interference may include information regarding whether the UE would likely fail to decode one or more transmissions as a result of the presence of the WIFI interference, such as one or more Speculative ACK bits as previously described. In some aspects, it is envisioned that the UE may periodically obtain and accumulate the WII and Speculative ACK bits over time in anticipation of receiving the request, and provide the accumulated information to the base station in the report. Processing may proceed from block 904 to block 906.

At block 906, the UE may make a determination whether a command has been received from the base station to switch to a different channel or band. For example, the UE may receive a command to switch from one LTE/LTE-A with unlicensed spectrum channel to LTE/LTE-A with unlicensed spectrum channel, or to switch from the LTE/LTE-A with unlicensed spectrum band to the licensed band. If it is determined, at block 906, that such a command has not been received, then the UE may receive, at block 908, data from the base station on the current channel or band. Otherwise, if the UE determines, at block 906, that such a command was received, then the UE may, at block 910, switch to the different channel or band specified by the command, and thereafter receive data from the base station, at block 908, on the different channel or band. Processing may return from block 908 to an earlier point in the process, such as block 900.

Figure 10:
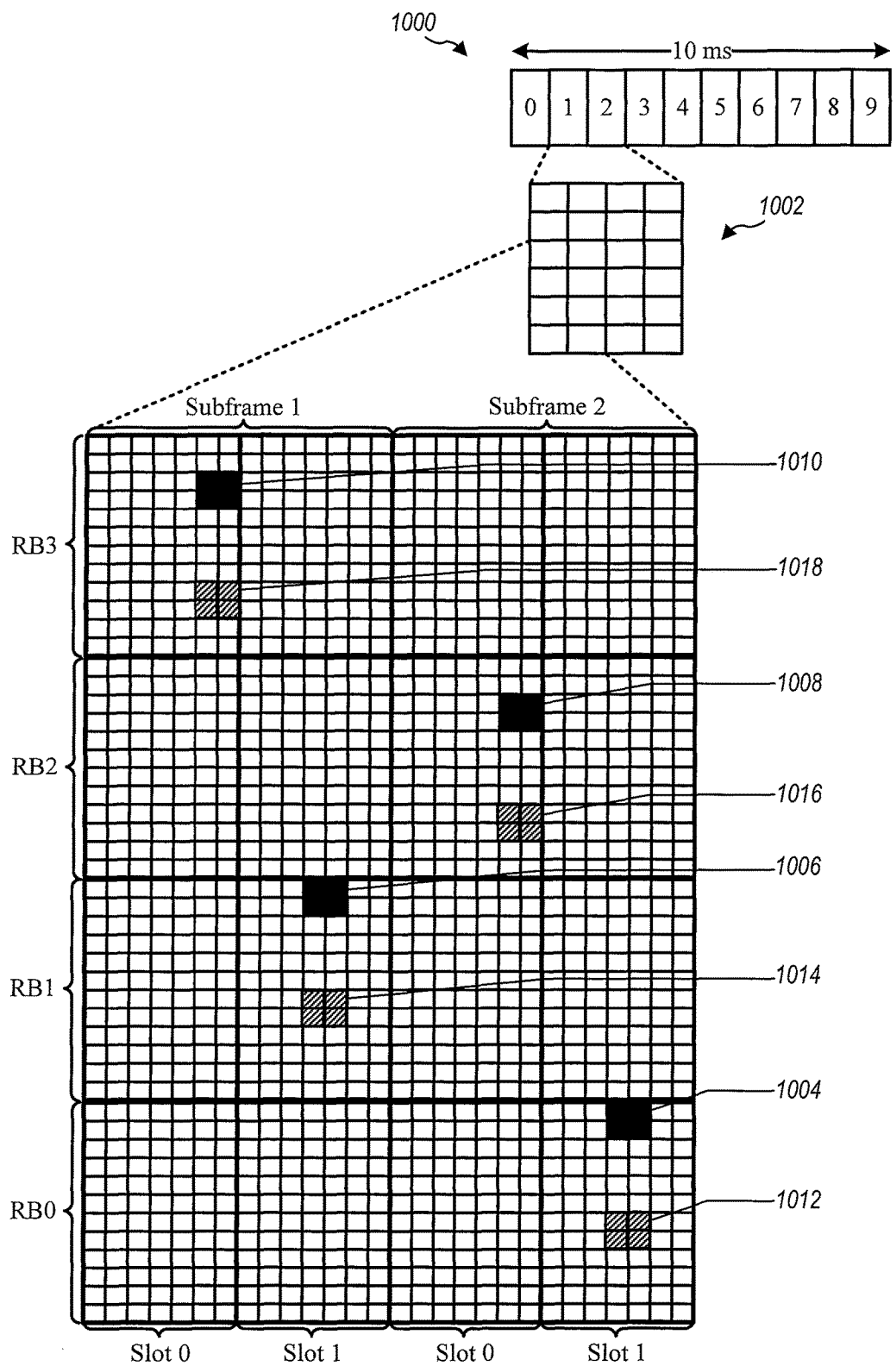
FIG. 10 shows a diagram that illustrates CSI-RS and IMR resources staggered across subframes of a radio frame and between slots of a subframe according to an aspect of the present disclosure.

FIG. 10 shows a diagram that illustrates CSI-RS and IMR resources staggered across subframes of a radio frame and between slots of a subframe according to an aspect of the present disclosure. For example, in a typical downlink frame structure, a 10 ms radio frame 1000 may be composed of ten equally sized subframes indexed zero to nine Each subframe may include two consecutive time slots, and a resource grid may be used to represent two consecutive time slots, each time slot including a resource block. In LTE, a resource block contains twelve consecutive subcarriers in the frequency domain. The radio frame 1000 may be composed of multiple rows of resource blocks and columns of subframes, with each subframe column being composed of pairs of time slots as shown at 1002. For purposes of illustration, a set of eight contiguous resource grids may be considered as shown in FIG. 10. This set of eight contiguous resource grids may be indexed in four rows of resource blocks RB0-RB3 indexed zero to three, and two columns of subframes indexed one to two, wherein each subframe is further subdivided into columns of time slots indexed zero to one.

According to some aspects of the present disclosure, channel state information (CSI) reference signal (CSI-RS) resources may be staggered across several subframes in a radio frame. For example, resource blocks zero and two may have CSI-RS resources transmitted in subframe two as at 1004 and 1008, whereas resource blocks one and three may have CSI RS resources transmitted in subframe one, as at 1006 and 1010. Alternatively or additionally, staggering may be performed between time slots within a subframes. For example, resource blocks zero and two may have CSI-RS resources staggered between time slots zero and one of subframe two as shown at 1008 and 1004, respectively. Similarly, resource blocks one and three may have CSI-RS resources staggered between time slots zero and one of subframe one as shown at 1010 and 1006, respectively.

The staggering of CSI-RS resources across subframes and/or between time slots, as described above, may better capture interference without requiring change in CSI overhead. It is envisioned that the staggering pattern employed by a base station may be communicated to other base stations for Coordinated Multipoint (CoMP) rate matching in PDSCH Quasi-Colocation Indicator (PQI) states. For example, if two antenna ports are assumed to be Quasi collocated then a UE may assume that the large scale properties of the channel over which a symbol on one antenna port is conveyed can be inferred from the channel over which a symbol of the other antenna port is conveyed. Large scale properties may include channel gain, delay spread, Doppler, etc. For CSI-RS resources assigned for eNBs other than the serving eNB, Quasi-colocation cannot be assumed (as they are signals from a different eNB). However, if CSI-RS signals are expected from several eNBs, the serving eNB may generate fewer symbols for the PDSCH (rate matching operation) to allow for some empty resources for the CSI-RS based measurement. If staggering is to be used, then the staggering pattern may to be indicated to other eNBs so that rate matching can be performed for several subframes appropriately.

Staggering better captures long bursts of time-varying interference and minimizes impact due to short WIFI packets, such as management and control frames. Although a tradeoff exists between capturing time-varying interference and improved CQI estimation, it is envisioned that higher densities may be employed to evaluate CQI for different sections of bandwidth. It is also envisioned that block staggering may be employed to enable the UE to compute a CQI report for each subband in a given section of bandwidth.

Staggering may also be applied to Interference Measurement Resource (IMR) resources as shown at 1012-1018. An IMR represents a set of resource elements (REs) on which the UE measures interference in an implementation-dependent way. An IMR may be given by a 4-port zero power channel state information reference signal (ZP-CSI-RS) resource. The network may be responsible for ensuring that the interference created/measured on the IMR is representative of the interference that the UE will encounter during actual PDSCH transmissions. As will be readily understood, these IMR resources may be zero-power CSI-RS resources employed in CoMP schemes for CSI feedback reporting. Different resource elements may be allocated for interference estimation by different transmission points, and/or may be allocated for interference estimation to be shared among multiple transmission points. Each transmission point group may be allocated a resource pattern that may be used for signaling as part of CSI feedback reporting. A mapping (e.g., implicit linkage) may exist between resource element patterns in a group to reduce signaling overhead. A UE may perform both channel estimation measurements and interference estimation measurements for each resource pattern group signaled by a base station, and provide a resulting channel state condition report to the base station for use in allocating resources to the UE.

It is envisioned that a fixed staggering pattern across subframes for all base stations. For example, a fixed staggering pattern may be employed for all base stations in a network or for all base stations in a CoMP cell. For LTE/LTE-A with unlicensed spectrum, because interference may be expected from other deployments, it may be preferable to fix the staggering pattern for all base stations in all deployments if a fixed staggering pattern is to be employed. However, it is alternatively envisioned that the base station may indicate the staggering pattern for IMR resources to other base stations. This indication may be accomplished by use of System Information Blocks, RRC Connection Setup/Reconfiguration messages, or other messages.

Figure 11:
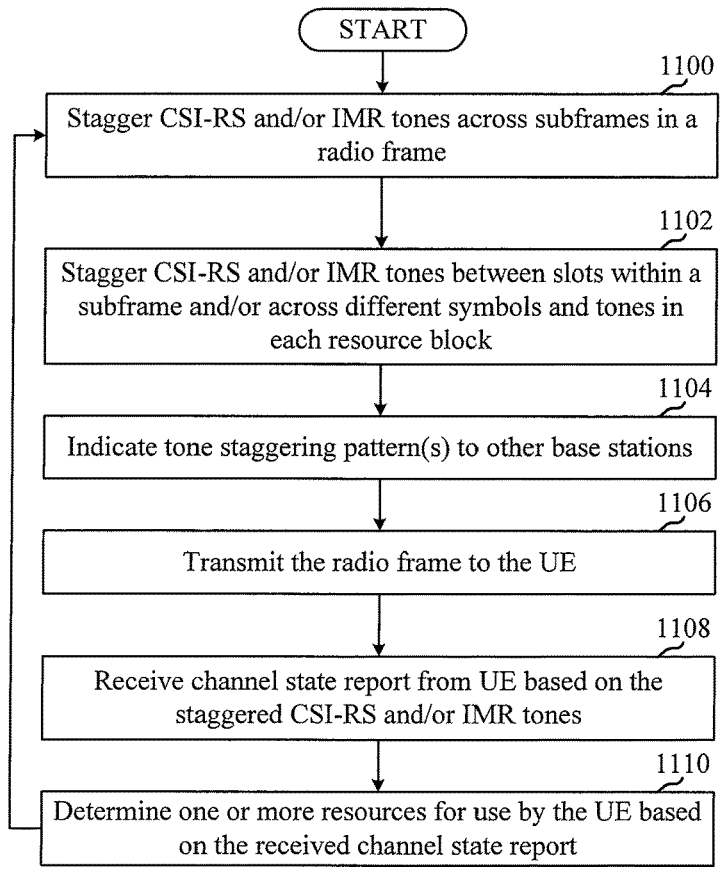
FIG. 11 shows a diagram that illustrates example blocks executed by a base station during a CSI-RS and/or IMR resource staggering process according to an aspect of the present disclosure.

FIG. 11 shows a diagram that illustrates example blocks executed by a base station during a CSI-RS and/or IMR resource staggering process according to an aspect of the present disclosure. For example, beginning at block 1100, the base station may stagger CSI-RS and/or IMR resources across subframes in a radio frame. Additionally, at block 1102, the base station may alternatively or additionally stagger CSI-RS resources and/or IMR resources between slots within subframes and/or across different symbols and tones in each resource block. Also, at block 1104, the base station may indicate the staggering pattern to other base stations. Further, at block 1106, the base station may transmit the radio frame to a UE. Still further, at block 1108, the base station may receive a channel state report from the UE that is based on the staggered CSI-RS and/or IMR resources. Yet further, at block 1110, the base station may determine one or more resources for use by the UE based on the received channel state report.

Figure 12:
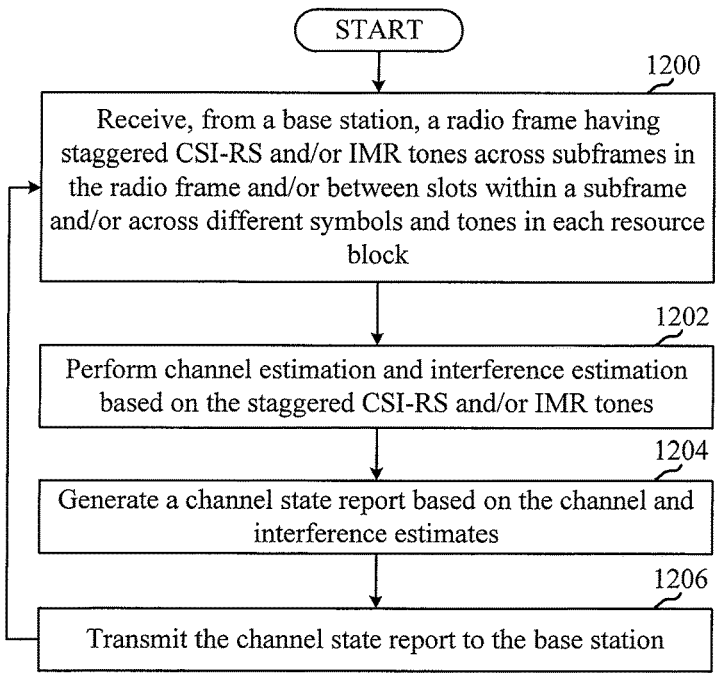
FIG. 12 shows a diagram that illustrates example blocks executed by a user equipment during a CSI-RS and/or IMR resource staggering process according to an aspect of the present disclosure.

FIG. 12 shows a diagram that illustrates example blocks executed by a user equipment during a CSI-RS and/or IMR resource staggering process according to an aspect of the present disclosure. For example, beginning at block 1200, the UE may receive a radio frame from a base station. This radio frame may have CSI-RS or IMR resources staggered across subframes and/or between slots within subframes and/or across different symbols and tones in each resource block, as previously described. Additionally, at block 1202, the UE may perform channel estimation and/or interference estimation based on the staggered CSI-RS and/or IMR resources. Also, at block 1202, the UE may generate a channel state report based on channel estimation and/or interference estimation. Further, at block 1206, the UE may transmit the channel state report to the base station.

Figure 13:
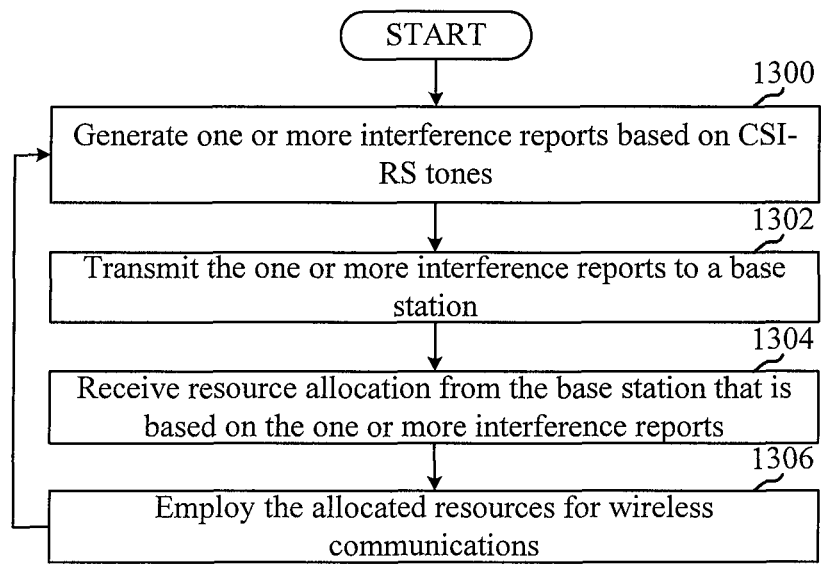
FIG. 13 shows a diagram that illustrates example blocks executed by a user equipment during an interference reporting process according to an aspect of the present disclosure.

FIG. 13 shows a diagram that illustrates example blocks executed by a user equipment during an interference reporting process according to an aspect of the present disclosure. For example, beginning at block 1300, the UE may generate one or more interference reports based on CSI-RS resources in a radio frame transmitted by a base station. Additionally, at block 1302, the UE may transmit the interference reports to a base station. Also, at block 1304, the UE may receive a resource allocation from a base station, and this resource allocation may be based on the one or more interference reports. Further, at block 1306, the UE may employ the allocated resources to carry out wireless communications.

In accordance with aspects of the present disclosure, the one or more interference reports generated at block 1300 may be based on unlicensed spectrum (e.g., WIFI) interference free CSI-RS resources and CSI-RS resources experiencing unlicensed spectrum (e.g., WIFI) interference. For example, the reports may include separate reports providing interference free CQI for WIFI interference free CSI-RS resources and interference CQI for CSI-resources experiencing WIFI interference. Alternatively, the reports may include composite reports based on both WIFI interference free CSI-RS resources and CSI resources experiencing WIFI interference. Such composite reports may require less overhead at the expense of CQI estimate accuracy due to averaging of CQI for both types of CSI-RS resources.

Figure 14:
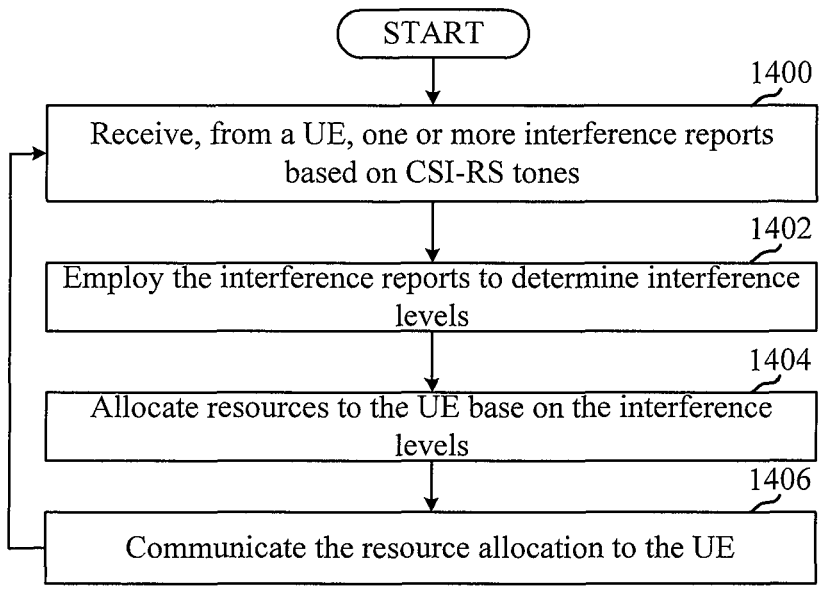
FIG. 14 shows a diagram that illustrates example blocks executed by a base station during an interference reporting process according to an aspect of the present disclosure.

FIG. 14 shows a diagram that illustrates example blocks executed by a base station during an interference reporting process according to an aspect of the present disclosure. For example, beginning at block 1400, the base station may receive, from a UE, one or more interference reports based on CSI-RS resources in a radio frame transmitted by the base station. These reports may include separate or composite reports for the unlicensed spectrum (e.g., WIFI) interference free CSI-RS resources and CSI-RS resources experiencing interference, as previously described. Additionally, at block 1402, the base station may employ the interference reports to determine interference levels. Also, at block 1404, the base station may allocate resources to the UE based on the determined interference levels. Further, at block 1406, the base station may communicate the resource allocation to the UE.

Figure 15:
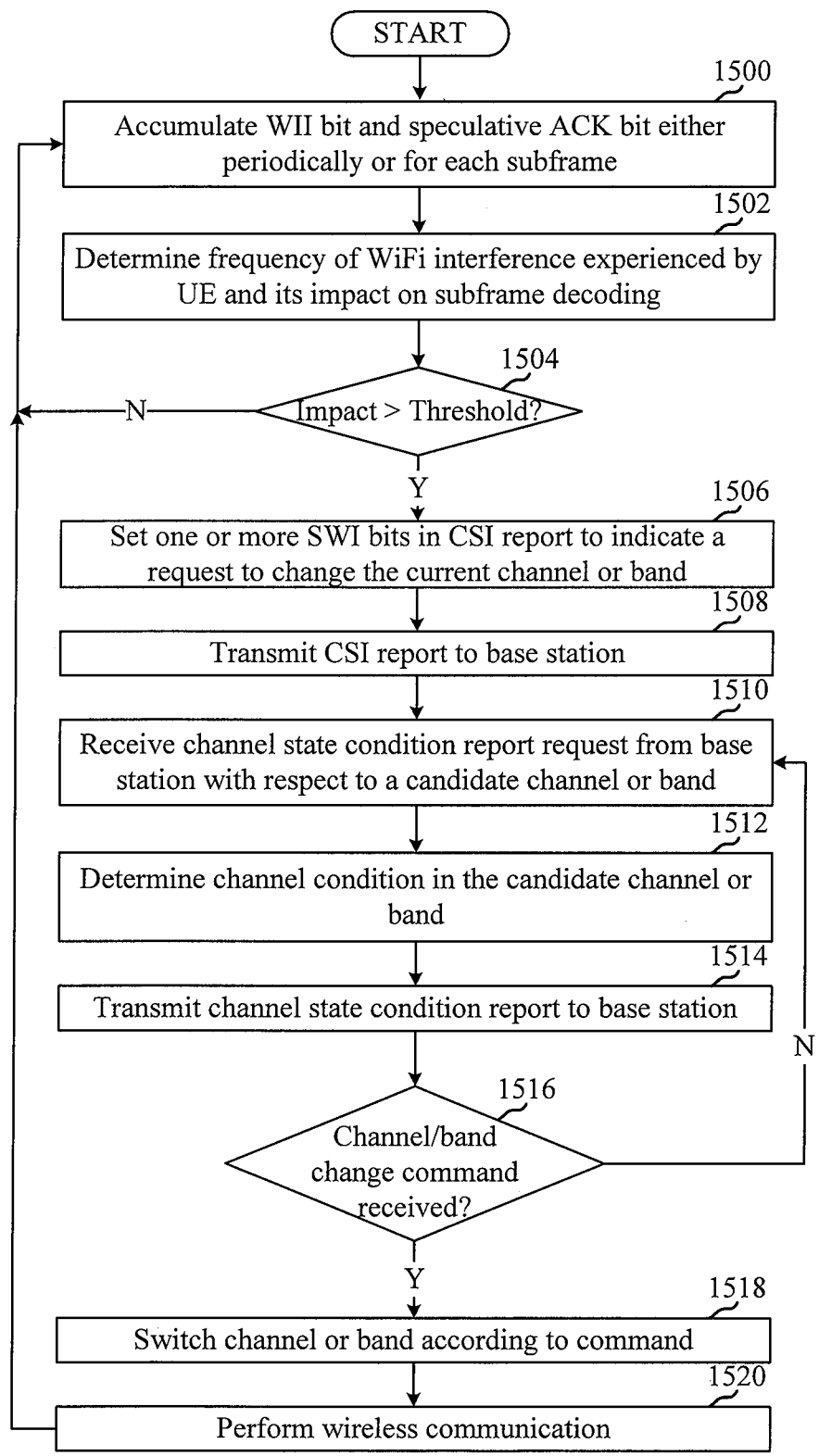
FIG. 15 shows a diagram that illustrates example blocks executed by a user equipment during a channel or band switch request handling process according to an aspect of the present disclosure.

FIG. 15 shows a diagram that illustrates example blocks executed by a user equipment during a channel or band switch request handling process according to an aspect of the present disclosure. For example, at block 1500, the UE may accumulate a WII bit and Speculative ACK bit either periodically or for each subframe. Additionally, at block 1502, the UE may determine the frequency of the unlicensed spectrum interference, such as WIFI interference, and its impact on subframe decoding. Also, at block 1504, the UE may determine whether the severity of the impact is sufficient to warrant corrective action. It is envisioned that the UE, in blocks 1500-1504, may carry out any or all of the same or similar operations carried out by a base station as previously described with reference to FIG. 7 and FIG. 8.

At block 1506, the base station may request corrective action from the base station. For example, the UE may set a switch indicator (SWI) bit provided in the CSI report to indicate a request to change the current channel or band. It is envisioned that the UE may request to switch to a different LTE/LTE-A with unlicensed spectrum channel or to the licensed band. The UE may then transmit this CSI report, at block 1508, to the base station, and allow the base station to take corrective action in any manner previously described. For example, it is envisioned that the base station may attempt to lower the MCS before attempting to switch the UE to a different channel or band.

In some aspects, it is envisioned that the base station may ask the UE for channel conditions in candidate channels or bands prior to switching the UE, and the UE may carry out operations to cooperate in such a procedure. In some aspects, the base station may desire this information simply for purposes of allocating MCS on the different channel or band. In other aspects, the base station may condition the switch of the UE to the different channel or band based on the reported channel conditions. For example, at block 1510, the UE may receive a channel state condition report request from the base station that specifies a candidate channel or band with respect to which the base station desires the channel condition information. Additionally, at block 1512, the UE may carry out operations to determine the channel conditions in the candidate channel or band specified in the request received from the base station. Also, at block 1514, the UE may transmit the channel state condition report for the candidate channel or band to the base station. Further, at block 1516, the UE may determine whether a command is received from the base station to change to a different channel or band, such as the candidate channel or band. If the UE determines, at block 1516, that such a command is not received, then processing may return to an earlier point in the process, such as block 1510, at which the UE may receive a new channel state condition report request from the base station specifying a different candidate channel or band. Otherwise, if the UE determines, at block 1516, that a command is received from the base station to switch to a different channel or band, then the UE may, at block 1518, switch to the different channel of band as specified by the command. Thereafter, the UE may, at block 1520, perform wireless communication over the different channel or band.

Figure 16:
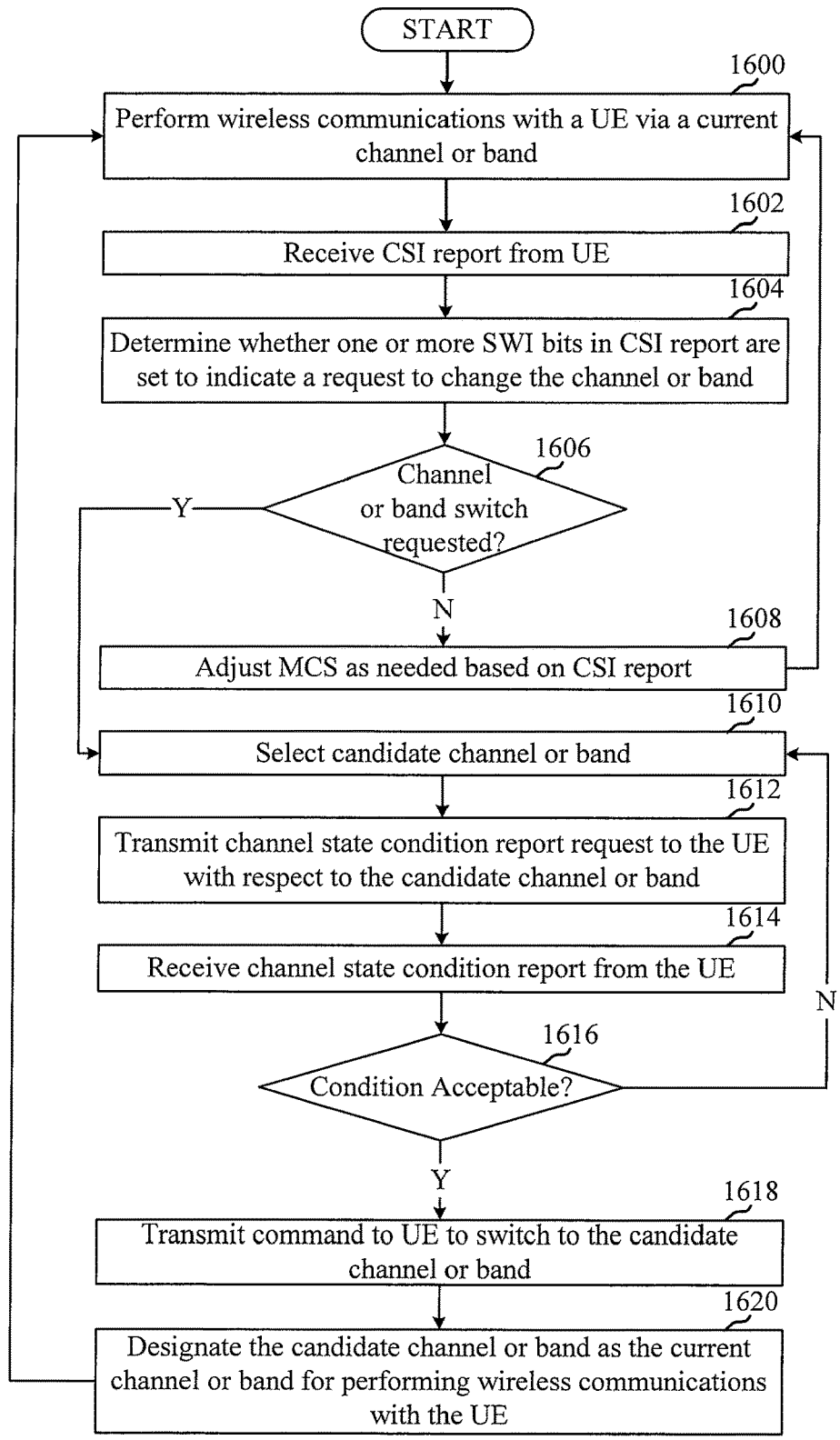
FIG. 16 shows a diagram that illustrates example blocks executed by a base station during a channel or band switch request handling process according to an aspect of the present disclosure.

FIG. 16 shows a diagram that illustrates example blocks executed by a base station during a channel or band switch request handling process according to an aspect of the present disclosure. For example, beginning at block 1600, the base station may perform wireless communications with a UE over a current channel or band, such as an LTE/LTE-A unlicensed spectrum channel. Additionally, at block 1602, the base station may receive a CSI report from the UE. Also, at block 1604, the base station may determine whether one or more SWI bits in the CSI report are set to indicate a request for the base station to take corrective action, such as by switching the UE to a different channel or band. It is envisioned that the request may be a request to switch from an LTE/LTE-A unlicensed spectrum channel to another LTE/LTE-A unlicensed spectrum channel. Alternatively or additionally, it is envisioned that the request may be a request to switch from an LTE/LTE-A unlicensed spectrum channel to the licensed band. If the base station determines, at block 1606, that no such request is made in the CSI report, then the base station may, at block 1608, adjust the MCS as needed based on contents of the CSI report. Processing may return from block 1608 to an earlier point in the process, such as block 1600. However, if the base station determines, at block 1606, that the CSI report contains such a request, then the base station may attempt to take corrective action.

In some aspects, it is envisioned that the base station may attempt to take corrective action according to any or all of the of the procedures previously described with respect to FIG. 7 and FIG. 8. For example, it is envisioned that the base station may lower the MCS as an alternative to switching the UE to a different channel or band. It is additionally envisioned that the base station, prior to switching the UE to a different channel or band, may select, at block 1610, a candidate channel or band, and transmit, at block 1612, a channel state condition report request to the UE that requests a report regarding the candidate channel or band. Additionally, upon receipt, at block 1614, of such a channel state condition report from the UE, the base station may determine, at block 1616, whether the channel conditions for the candidate channel or band are acceptable. If the base station determines, at block 1616 that the channel conditions are acceptable, then the base station may transmit a command to the UE, at block 1618, to switch to the candidate channel or band. The base station may also, at block 1620, designate the candidate channel or band as the current channel or band for performing wireless communications with the UE. Block 1620 may additionally involve allocating resources to the UE on the different channel or band with an MCS based on the contents of the report received at block 1614.

Figure 17:
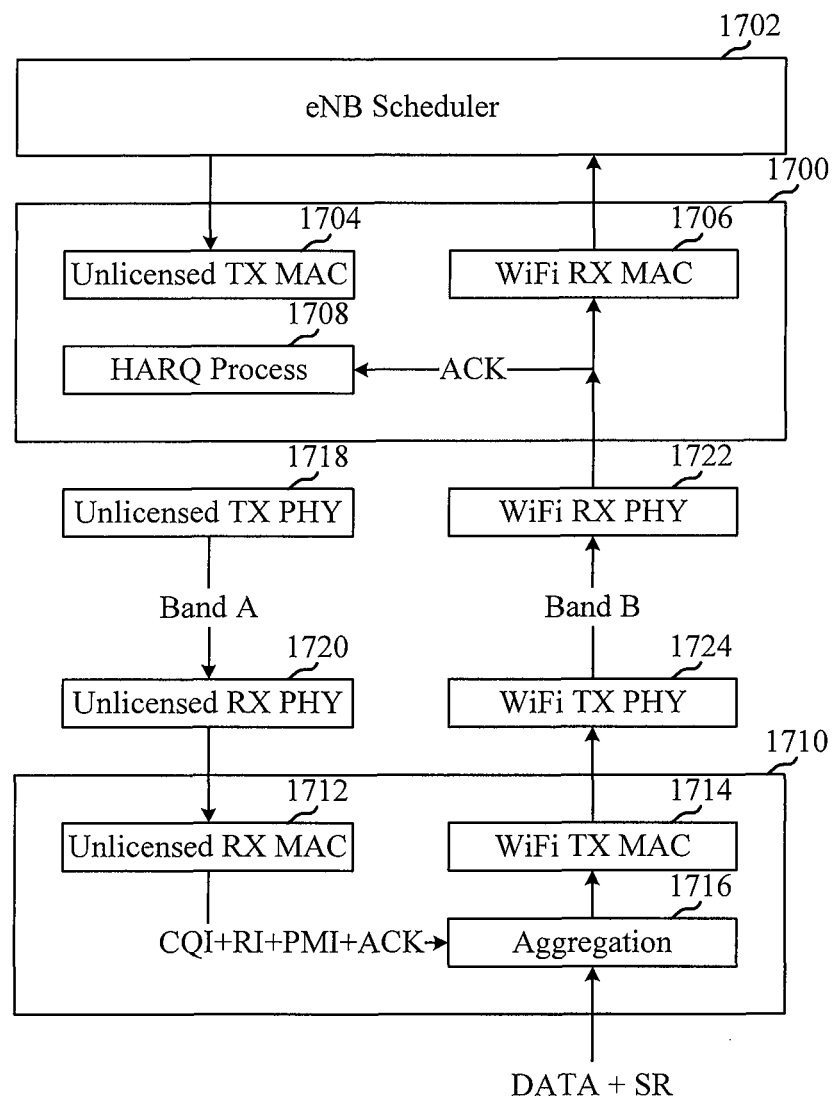
FIG. 17 shows a diagram that illustrates a base station and user equipment carrying out an inter-RAT channel state information reporting process according to an aspect of the present disclosure.

FIG. 17 shows a diagram that illustrates a base station and user equipment carrying out an inter-RAT channel state information reporting process according to an aspect of the present disclosure. For example, a base station 1700 responsive to an eNB scheduler 1702 may implement an LTE/LTE-A with unlicensed spectrum Transmitter (TX) Media Access Control (MAC) layer 1704, an unlicensed spectrum receiver MAC layer, such as WIFI Receiver (RX) MAC layer 1706, and a HARQ process 1708. Additionally, a UE 1710 may implement an LTE/LTE-A with unlicensed spectrum RX MAC layer 1712, an unlicensed spectrum TX MAC layer, such as WIFI TX MAC layer 1714, and an aggregation process 1716. Base station 1700 may transmit messages via LTE/LTE-A with unlicensed spectrum TX Physical (PHY) layer 1718 and LTE/LTE-A with unlicensed spectrum RX PHY layer 1720 to UE 1710 over a first band, which may be referred to as an LTE/LTE-A unlicensed spectrum band. The aggregation process 1716 may be responsive to data and scheduling requests from a higher layer, and responsive to CQI, rank indicator (RI), pre-coding matrix indicator (PMI), and ACK data from the LTE/LTE-A with unlicensed spectrum RX MAC layer 1712, to transmit messages to base station 1700 via unlicensed spectrum TX PHY layer, such as WIFI TX PHY layer 1724, and unlicensed spectrum RX PHY layer, such as WIFI RX PHY layer 1722, over a second band, which may be referred to as a WIFI band. In accordance with aspects described herein, UE 1710 may transmit ACK/NAK and CSI reports for the first band to the base station 1700 over the second band. In turn, HARQ process 1708 of the base station 1700 may be responsive to ACK/NAK received over the second band in order to administer retransmissions over the first band, and base station 1700 may be responsive to CSI reports received over the second band to allocate resources for the UE 1710 on the first band, adjust MCS for the UE 1710 on the first band, and/or switch the UE to a different channel or band, as previously described. As described in greater detail below with respect to FIG. 18 and FIG. 19, it is envisioned that the UE 1710 may transmit the CSI reports over the second band in response to a determination that control capacity on the first band is overloaded.

Figure 18:
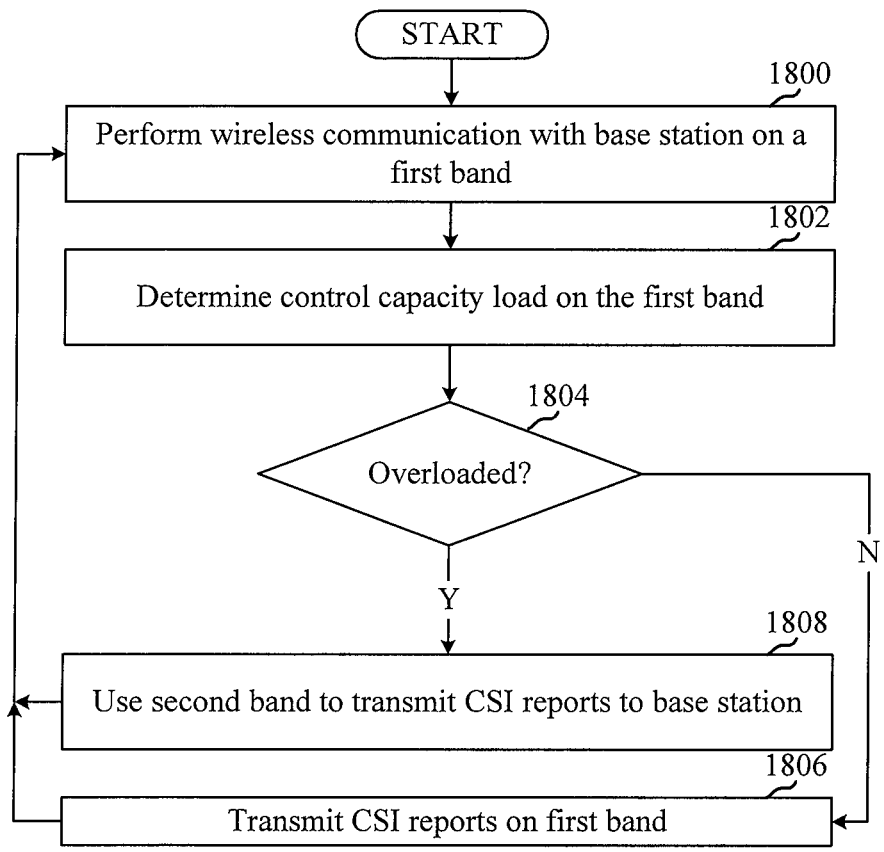
FIG. 18 shows a diagram that illustrates example blocks executed by a user equipment during an inter-RAT channel state information reporting process according to an aspect of the present disclosure.

FIG. 18 shows a diagram that illustrates example blocks executed by a user equipment during an inter-RAT channel state information reporting process according to an aspect of the present disclosure. For example, beginning at block 1800, the UE may perform wireless communications with a base station on a first band, which may be an LTE/LTE-A unlicensed spectrum band. Additionally, at block 1802, the UE may determine control capacity load on the first band, and determine, at block 1804, whether the control capacity on the first band is overloaded. If the UE determines, at block 1804, that control capacity on the first band is not overloaded, then the UE may transmit CSI reports on the first band. Otherwise, if the UE determines, at block 1804, that the control capacity on the first band is overloaded, then the UE may use a second band, which may be an unlicensed band (e.g., WIFI band), to transmit the CSI reports to the base station. It should be appreciated that, when the first band is an LTE/LTE-A unlicensed spectrum band, and when the second band is a WIFI band, then the Radio Access Technologies (RATs) of the first band and the second band are different from one another. It is also envisioned that other RATs may also be utilized that are different from one another, as may be readily apparent to one skilled in the art.

Figure 19:
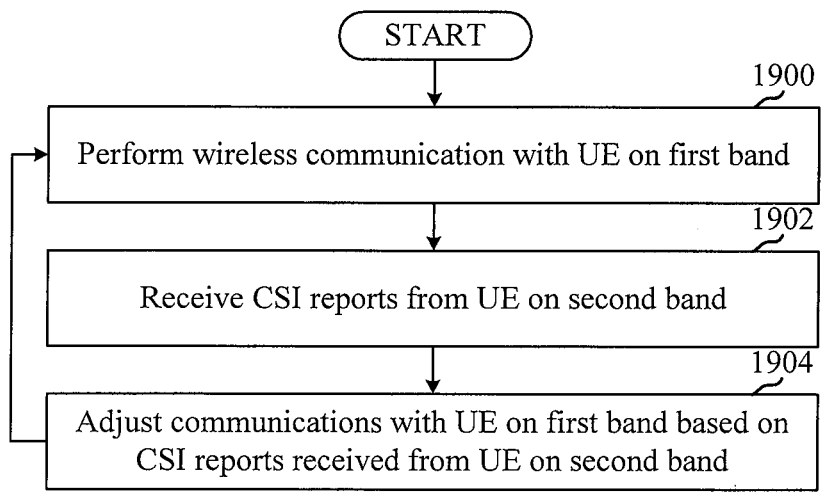
FIG. 19 shows a diagram that illustrates example blocks executed by a base station during an inter-RAT channel state information reporting process according to an aspect of the present disclosure.

FIG. 19 shows a diagram that illustrates example blocks executed by a base station during an inter-RAT channel state information reporting process according to an aspect of the present disclosure. For example, beginning at block 1900, the base station may perform wireless communication with a UE on a first band, which may be an LTE/LTE-A unlicensed spectrum band. Additionally, at block 1902, the base station may receive CSI reports from the UE on a second band, which may be an unlicensed band (e.g., WIFI band). Also, at block 1904, the base station may adjust communications with the UE on the first band based on CSI reports received from the UE on the second band. For example, it is envisioned that the base station may, at block 1904, allocate resources for the UE, adjust MCS for the UE, and/or switch the UE to a different channel or band, as previously described. It should be appreciated that, when the first band is an LTE/LTE-A unlicensed spectrum band, and when the second band is a WIFI band, then the RATs of the first band and the second band are different from one another. It is also envisioned that other RATs may also be utilized that are different from one another, as may be readily apparent to one skilled in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6-9, 11-16, 18, and 19 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a non-transitory computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
generating, by a base station, at least one of Channel State Information Reference Signal (CSI-RS) or Interference Measurement Resource (IMR); and
transmitting the CSI-RS or the IMR in a radio frame to a user equipment (UE), wherein the transmitting of the CSI-RS or the IMR includes transmitting the CSI-RS or the IMR on resources located in different resource blocks in terms of frequency, wherein the resources on which the CSI-RS or the IMR is transmitted are staggered within the radio frame between slots within a subframe.

2. The method of claim 1, further including:
receiving, by the base station, a channel state report form the UE, wherein the channel state report is based on the staggered at least one of the resources on which the CSI-RS or the IMR is transmitted.

3. The method of claim 2, further including:
determining one or more resources for use by the UE based on the received channel state report.

4. The method of claim 1, wherein the resources on which the CSI-RS or the IMR is transmitted are further staggered across different symbols and tones in each resource block.

5. A method of wireless communication, comprising:
generating, by a base station, at least one of Channel State Information Reference Signal (CSI-RS) or Interference Measurement Resource (IMR);
indicating, by the base station, to other base stations at least one of:
a resource staggering pattern;
an IMR resource configuration; and
a null tone configuration; and
transmitting the CSI-RS or the IMR in a radio frame to a user equipment (UE), wherein the transmitting of the CSI-RS or the IMR includes transmitting the CSI-RS or the IMR on resources located in different resource blocks in terms of frequency, wherein the resources on which the CSI-RS or the IMR is transmitted are staggered within the radio frame at least one of:
between slots within a subframe; or
across different symbols and tones in each resource block.

6. The method of claim 5, wherein the indicating includes indicating, by the base station, to other base stations the resource staggering pattern.

7. The method of claim 5, wherein the indicating includes indicating, by the base station, to other base stations the IMR resource configuration.

8. The method of claim 5, wherein the indicating includes indicating, by the base station, to other base stations the null tone configuration.

9. An apparatus configured for wireless communication, the apparatus comprising:
at least one processor; and
a memory coupled to the at least one processor,
wherein the at least one processor is configured:
to generate, by a base station, at least one of Channel State Information Reference Signal (CSI-RS) or Interference Measurement Resource (IMR); and
to transmit the CSI-RS or the IMR in a radio frame to a user equipment (UE), wherein the configuration to transmit includes configuration to transmit the CSI-RS or the IMR on resources located in different resource blocks in terms of frequency, wherein the resources on which the CSI-RS or the IMR is transmitted are staggered within the radio frame between slots within a subframe.

10. The apparatus of claim 9, further including configuration of the at least one processor to receive, by the base station, a channel state report form the UE, wherein channel state report is based on the staggered at least one of the resources on which the CSI-RS or the IMR is transmitted.

11. The apparatus of claim 10, further including configuration of the at least one processor to determine one or more resources for use by the UE based on the received channel state report.

12. An apparatus configured for wireless communication, the apparatus comprising:
at least one processor; and
a memory coupled to the at least one processor,
wherein the at least one processor is configured:
to generate, by a base station, at least one of Channel State Information Reference Signal (CSI-RS) or Interference Measurement Resource (IMR);
to indicate, by the base station, to other base stations at least one of:
a resource staggering pattern;
an IMR resource configuration; and
a null tone configuration; and
to transmit the CSI-RS or the IMR in a radio frame to a user equipment (UE), wherein the configuration to transmit includes configuration to transmit the CSI-RS or the IMR on resources located in different resource blocks in terms of frequency, wherein the resources on which the CSI-RS or the IMR is transmitted are staggered within the radio frame at least one of:
between slots within a subframe; or
across different symbols and tones in each resource block.

13. A non-transitory computer-readable medium having program code recorded thereon, comprising:
code for causing one or more computers to generate, by a base station, at least one of Channel State Information Reference Signal (CSI-RS) or Interference Measurement Resource (IMR); and
code for causing one or more computers to transmit the CSI-RS or the IMR in a radio frame to a user equipment (UE), wherein the code for causing the one or more computers to transmit includes code for causing the one or more computers to transmit the CSI-RS or the IMR on resources located in different resource blocks in terms of frequency, wherein the resources on which the CSI-RS or the IMR is transmitted are staggered within the radio frame between slots within a subframe.

14. The non-transitory computer-readable medium of claim 13, further including:
code for causing the one or more computers to receive, by the base station, a channel state report form the UE, wherein the channel state report is based on the staggered at least one of the resources on which the CSI-RS or the IMR is transmitted.

15. The non-transitory computer-readable medium of claim 14, further including:
code for causing the one or more computers to determine one or more resources for use by the UE based on the received channel state report.

16. A non-transitory computer-readable medium having program code recorded thereon, comprising:
code for causing one or more computers to generate, by a base station, at least one of Channel State Information Reference Signal (CSI-RS) or Interference Measurement Resource (IMR);
code for causing the one or more computers to indicate, by the base station, to other base stations at least one of:
a resource staggering pattern;
an IMR resource configuration; and
a null tone configuration; and
code for causing one or more computers to transmit the CSI-RS or the IMR in a radio frame to a user equipment (UE), wherein the code for causing the one or more computers to transmit includes code for causing the one or more computers to transmit the CSI-RS or the IMR on resources located in different resource blocks in terms of frequency, wherein the resources on which the CSI-RS or the IMR is transmitted are staggered within the radio frame at least one of:
between slots within a subframe; or
across different symbols and tones in each resource block.

17. A method of wireless communication, comprising:
receiving, by a user equipment (UE), at least one of Channel State Information Reference Signal (CSI-RS) or Interference Measurement Resource (IMR) in a radio frame from a base station, wherein the receiving of the CSI-RS or the IMR includes receiving the CSI-RS or the IMR on resources located in different resource blocks in terms of frequency, wherein the resources on which the CSI-RS or the IMR is received are staggered within the radio frame
between slots within a subframe; and
performing, by the UE, at least one of channel estimation or interference estimation based on the staggered at least one of the resource on which the CSI-RS or the IMR is received.

18. The method of claim 17, further including:
generating, by the UE, a channel state report based on the at least one of channel estimation or interference estimation.

19. The method of claim 18, further including:
transmitting, by the UE, the channel state report to the base station.

* * * * *